(12) United States Patent
Koyanagi et al.

(10) Patent No.: US 6,323,898 B1
(45) Date of Patent: *Nov. 27, 2001

(54) TRACKING APPARATUS AND TRACKING METHOD

(75) Inventors: Masakazu Koyanagi; Tadafusa Tomitaka, both of Chiba; Taro Suito, Kanagawa; Naoyasu Hosonuma, Saitama, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/772,922

(22) Filed: Dec. 24, 1996

(30) Foreign Application Priority Data

Dec. 28, 1995 (JP) ............................................. P07-342429

(51) Int. Cl.[7] ..................................................... H04N 5/225
(52) U.S. Cl. ............................................................ 348/169
(58) Field of Search .................................. 348/151–159, 348/169–171, 211, 291, 170, 152; 250/332; 178/6.8; 701/209, 300; 382/107, 152; H04N 5/225

(56) References Cited

U.S. PATENT DOCUMENTS

| | | | | |
|---|---|---|---|---|
| 3,988,534 | * | 10/1976 | Sacks | 178/6.8 |
| 5,404,013 | * | 4/1995 | Tajima | 250/332 |
| 5,473,368 | * | 12/1995 | Hart | 348/155 |
| 5,546,125 | * | 8/1996 | Tamitaka et al. | 348/169 |
| 5,559,551 | * | 9/1996 | Sakamoto et al. | 348/169 |
| 5,677,733 | * | 10/1997 | Yoshimura et al. | 348/362 |
| 5,757,422 | * | 5/1998 | Matsumura | 348/169 |
| 5,761,326 | * | 6/1998 | Brady et al. | 382/103 |
| 5,764,786 | * | 6/1998 | Kuwashima et al. | 382/107 |
| 5,787,314 | * | 7/1998 | Iwane | 396/95 |
| 5,835,641 | * | 11/1998 | Sotada et al. | 348/291 |
| 5,838,368 | * | 11/1998 | Masunaga et al. | 348/211 |

* cited by examiner

*Primary Examiner*—Chris Kelley
*Assistant Examiner*—Tung Vo
(74) *Attorney, Agent, or Firm*—Frommer Lawrence & Haug LLP; William S. Frommer; Dexter T. Chang

(57) ABSTRACT

A tracking apparatus for tracking an imaging object, includes: imaging means for imaging the imaging object; driving means for driving the imaging means to perform panning and tilting; position detection means for detecting a position of the imaging object in an image outputted from the imaging means; automatic tracking means for calculating a displacement amount between the position of the imaging object detected by the position detection means and a reference position in the image outputted from the imaging means and controlling the driving means based on the displacement amount so that the position of the imaging object may coincide with the reference position to automatically track the imaging object; and reference position setting means for setting the reference position.

20 Claims, 23 Drawing Sheets

FIG. IA
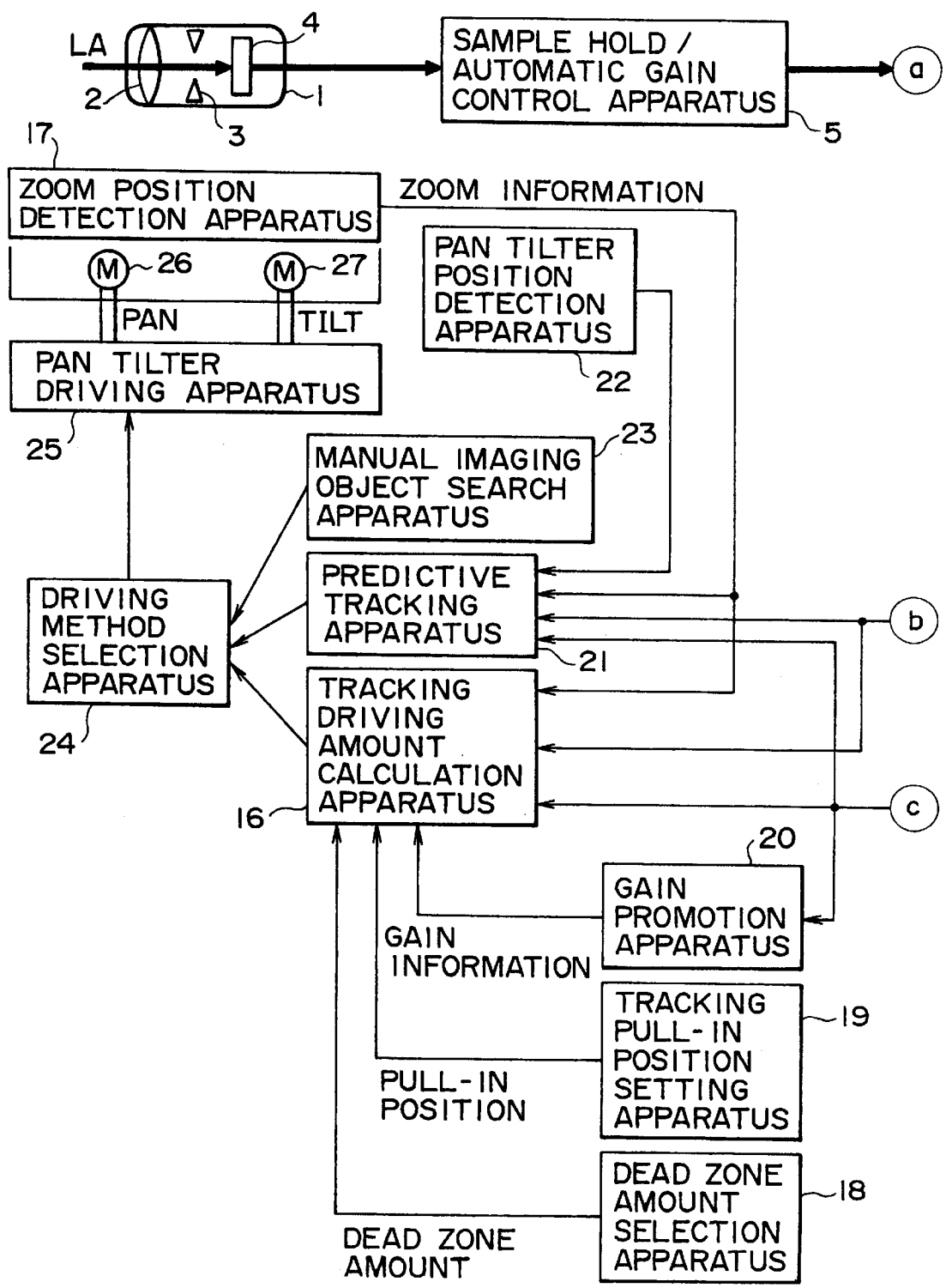

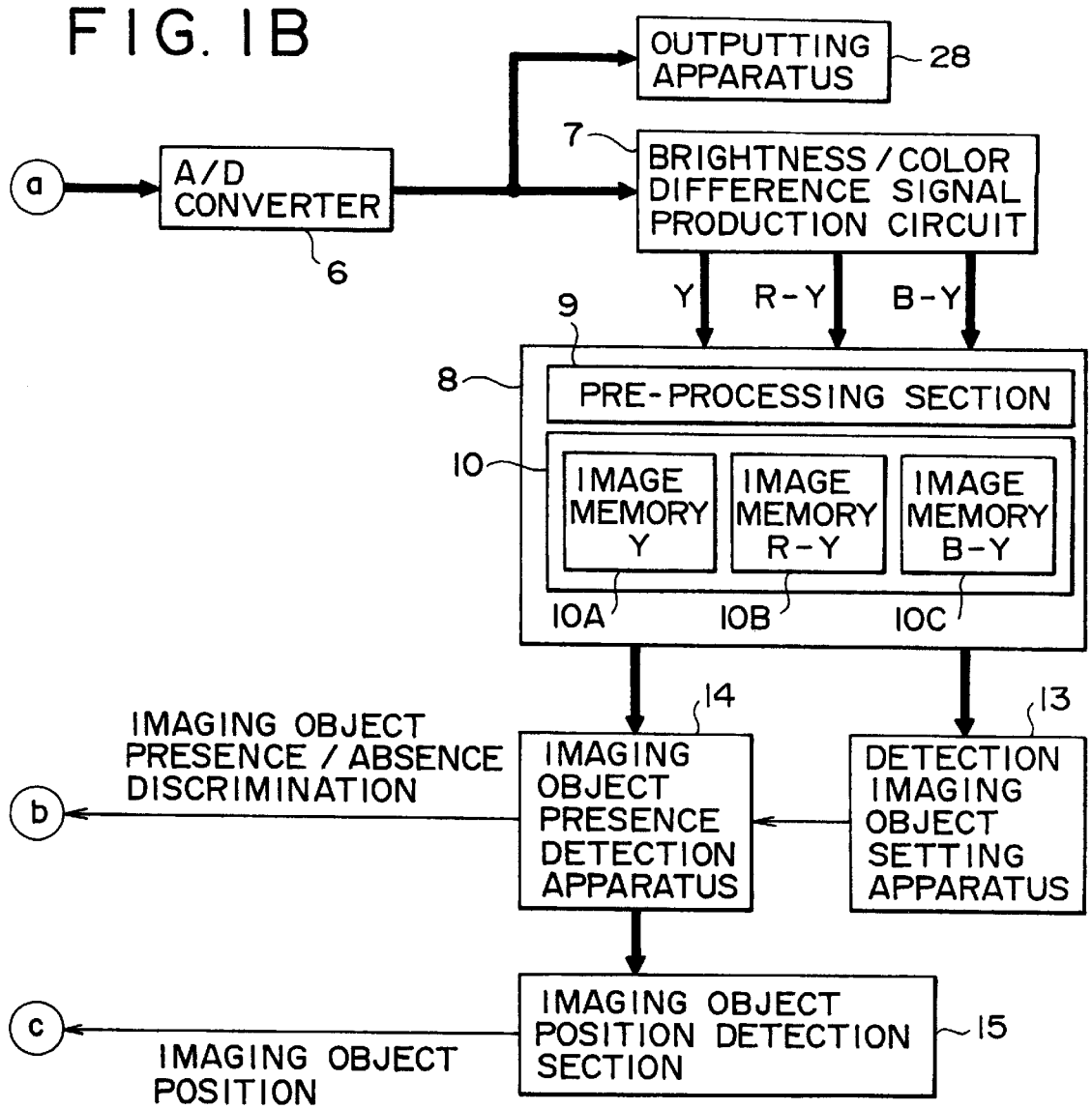
FIG. IB
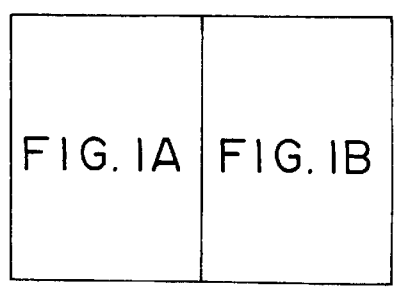
FIG. I

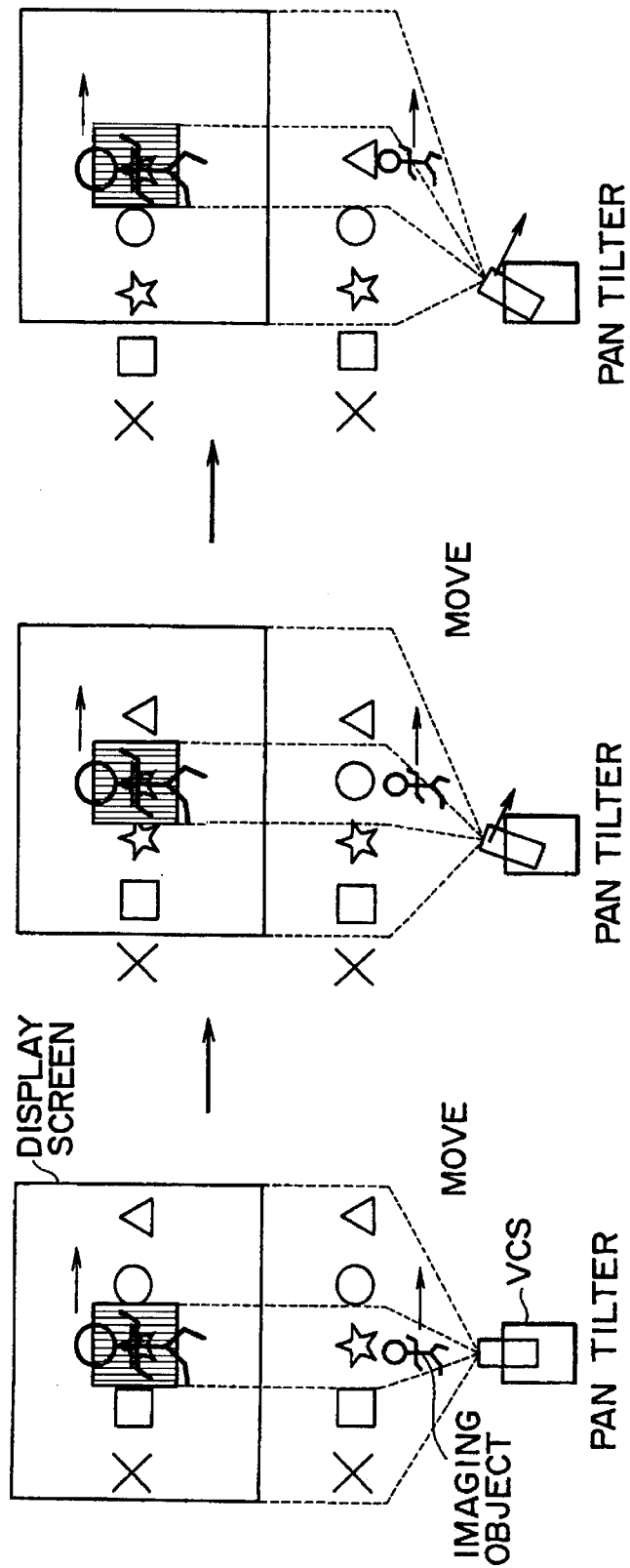

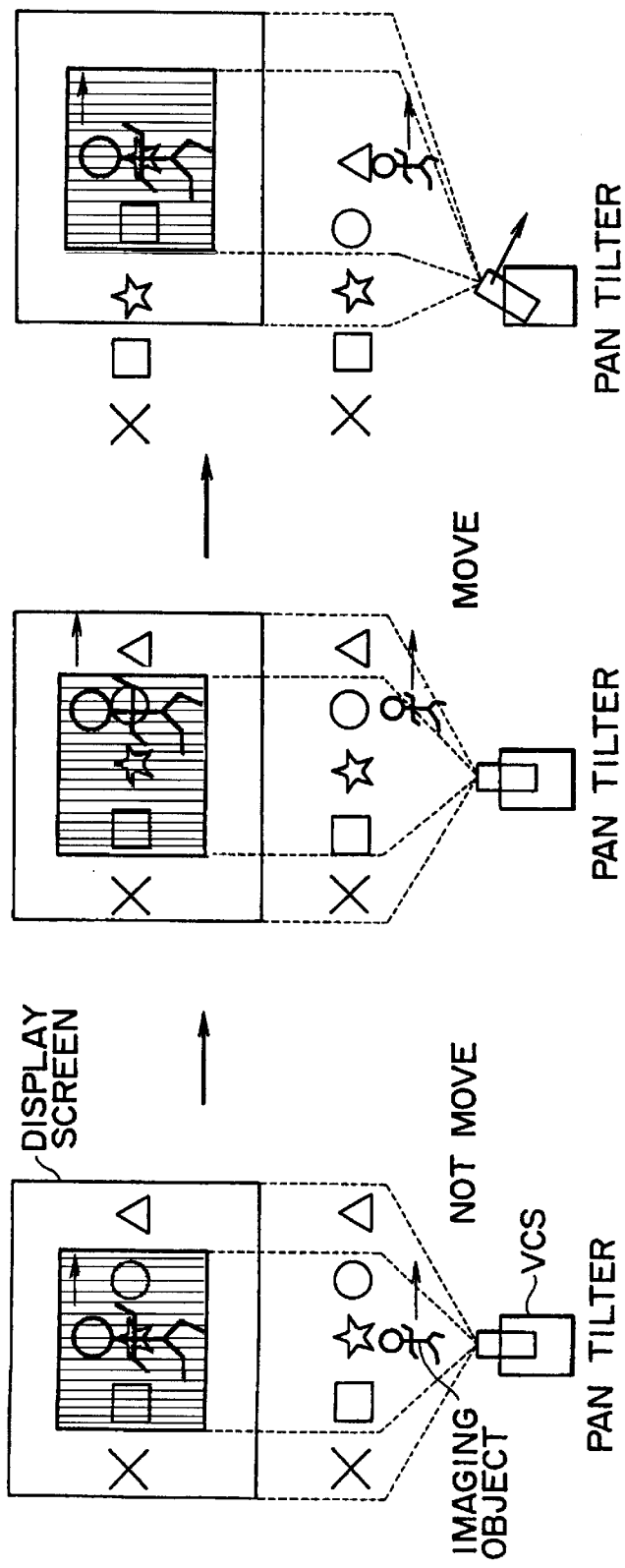

FIG. 4A

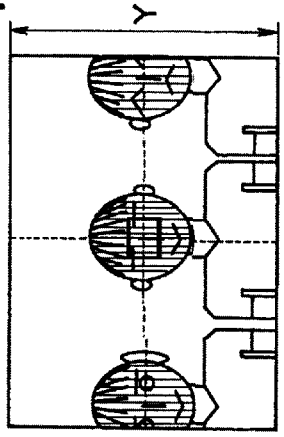

REFERENCE MEASUREMENT FRAME x center = X/2
y center = Y/2

WHEN IMAGING OBJECT IS ONE PERSON. FACE IS RECOGNIZED AND REFERENCE FOR TRACKING IS PLACED AT CENTER OF SCREEN.

FIG. 4B

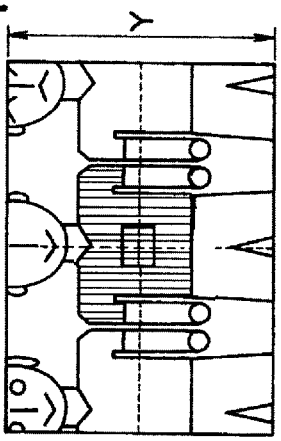

IF TRIED TO RECOGNIZE FACE OF PERSON AT CENTER, IT MAY POSSIBLY BE RECOGNIZED AS FACE OF ANOTHER PERSON THEREAROUND IN ERROR.

● DENOTES RECOGNITION POSITION
□ DENOTES CENTER OF TRACKING PULL-IN

FIG. 4C

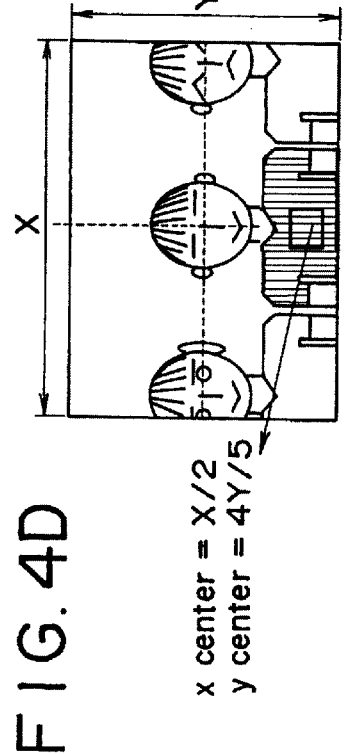

IF CLOTHES DIFFERENT FROM THOSE OF ANOTHER PERSON ARE SELECTED AS OBJECT OF RECOGNITION. CLOTHES ARE DETERMINED AS CENTER OF TRACKING. AND FACE OF PERSON TO BE IMAGED ORIGINALLY PROJECT FROM SCREEN.

FIG. 4D

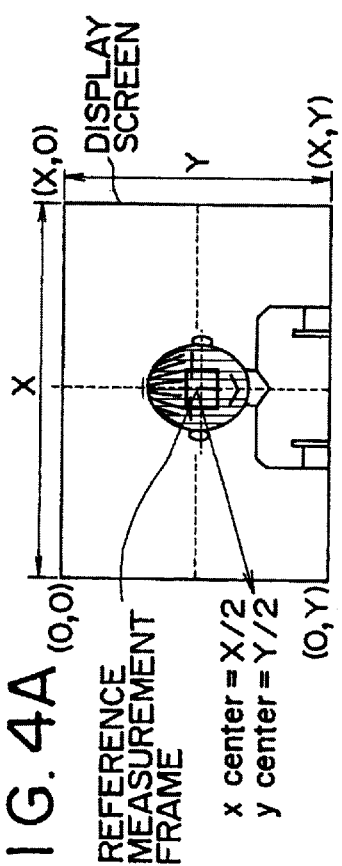

x center = X/2
y center = 4Y/5

ALSO IN THIS CASE, TRACKING CAN BE PERFORMED REGULARLY BY SETTING OBJECT OF RECOGNITION TO CLOTHES AND SETTING REFERENCE OF TRACKING TO LOWER POSITION.

SETTING OF PULL-IN POSITION BY TRACKING PULL-IN POSITION SETTING APPARATUS

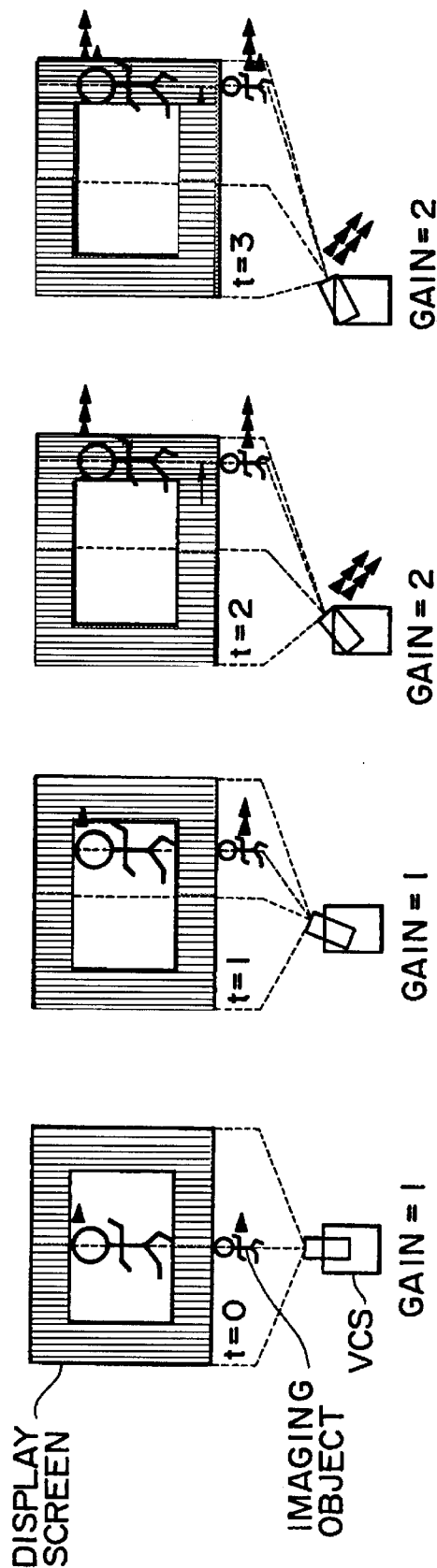

SPEED AND TIME OF PAN TILTER

DELAY AMOUNT AND TIME OF PAN TILTER

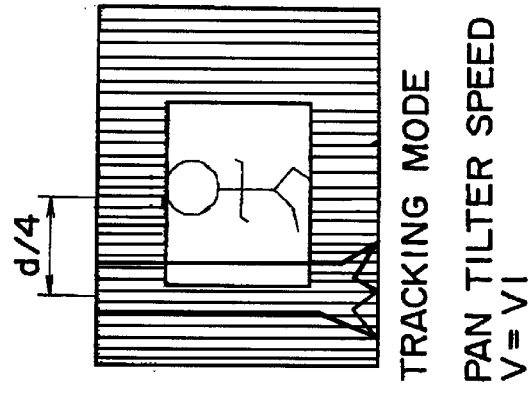
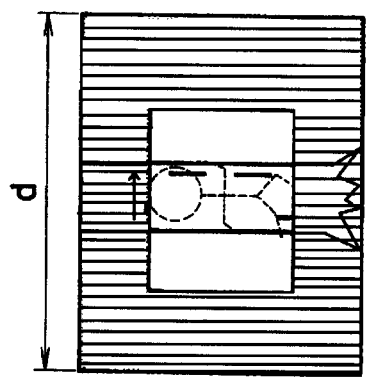
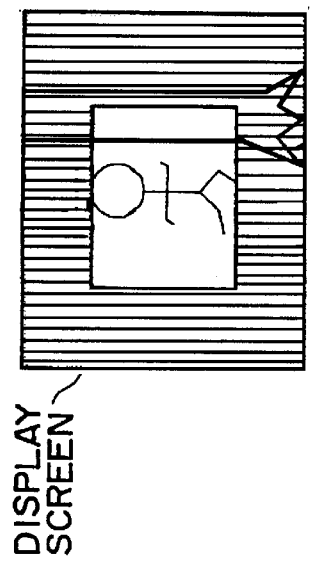

PREDICTION FOR SCREEN CENTRAL PORTION

FIG. 8A — TRACKING MODE, PAN TILTER SPEED V=V0

FIG. 8B — PREDICTION MODE (PREDICTION AMOUNT d/4), PAN TILTER SPEED V=V0

FIG. 8C — TRACKING MODE, PAN TILTER SPEED V=V1

☐ DENOTES PREDICTED AMOUNT INCREASING REGION

WHEN IMAGING OBJECT IS MISSED IN PROXIMITY OF CENTER OF SCREEN, SINCE POSSIBILITY THAT IMAGING OBJECT MAY DISAPPEAR FROM ANGLE OF VIEW IS LOW, COMPARATIVELY SMALL PREDICTION AMOUNT (d/4) IS SET AND PAN TILTER IS DRIVEN AT SPEED AND IN DIRECTION SAME AS THOSE WHEN IMAGING OBJECT IS MISSED.

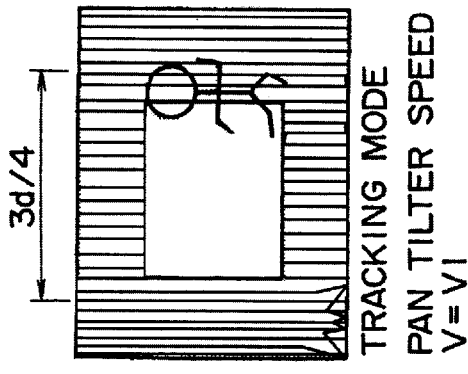

FIG. 9C TRACKING MODE PAN TILTER SPEED V=V1

FIG. 9D PREDICTION MODE (COMPLETION OF DRIVING BY PREDICTION AMOUNT) PAN TILTER SPEED V=V0

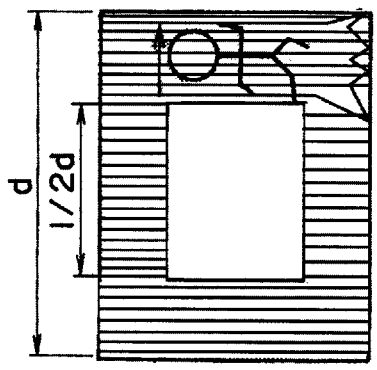

FIG. 9B PREDICTION MODE (PREDICTION AMOUNT 3d/4) PAN TILTER SPEED V=V0

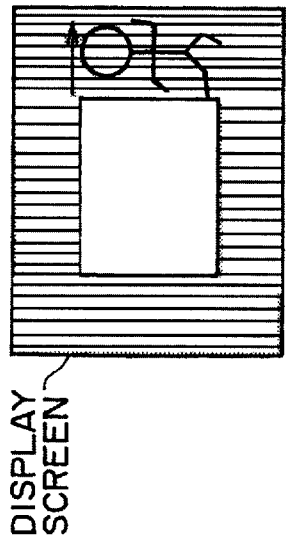

FIG. 9A TRACKING MODE PAN TILTER SPEED V=V0

PREDICTION AT END OF SCREEN
DISPLAY SCREEN

WHEN IMAGING OBJECT IS MISSED AT END OF SCREEN. LONGER DISTANCE (3d/4) THAN USUAL IS PREDICTED. TAKING IT INTO CONSIDERATION THAT IMAGING OBJECT MAY REMAIN BEHIND OBSTACLE. PREDICTION AMOUNT IS DETERMINED AS AMOUNT WITH WHICH POSITION AT WHICH IMAGING OBJECT HAS DISAPPEARED FROM SCREEN REMAINS AT THE OTHER END OF SCREEN. IN THIS INSTANCE, IMAGING OBJECT CAN BE FOUND OUT ALSO WHEN IMAGING OBJECT PASSES OBSTACLE OR REMAINS BEHIND OBSTACLE.

▨ DENOTES PREDICTION AMOUNT EXPANSION REGION

FIG. 12B

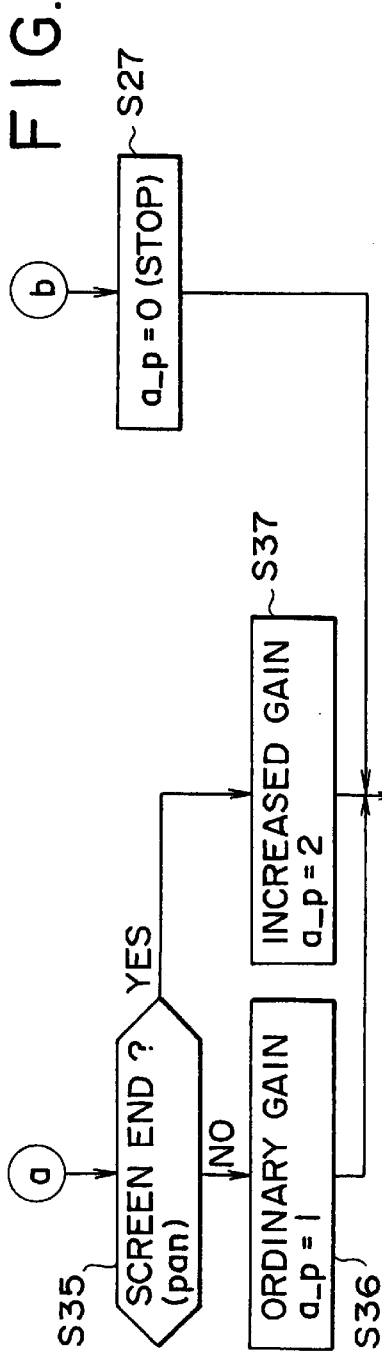

S27: a_p = 0 (STOP)

S35: SCREEN END ? (pan)
- NO → S36: ORDINARY GAIN a_p = 1
- YES → S37: INCREASED GAIN a_p = 2

S28: CALCULATION OF SPEED $V_p = 1/Z_{oom\_now} \times a\_p \times f(ex)$

S29: SETTING OF DIRECTION

RETURN cnt_in_p (COUNTER TO RUN TO STOP OPERATION)
cnt_out_p (COUNTER TO RUN TO START OPERATION)
MAX_in_p (STOPS OPERATION WHEN cnt_in BECOMES EQUAL TO THIS VALUE)
MAX_out_p (STARTS OPERATION WHEN cnt_out BECOMES EQUAL TO THIS VALUE)
a_p (GAIN INCREASING COEFFICIENT FOR PERIPHERY OF SCREEN)
Zoom_now (CURRENT ZOOM MAGNIFICATION (WITH REFERENCE TO END OF wide))
f ( ) (SERVO FUNCTION)
x_center (COORDINATES OF CURRENT POSITION OF IMAGING OBJECT)
X_in (VALUE OF DEAD ZONE FOR STOPPING OPERATION)
X_out (VALUE OF DEAD ZONE FOR STARTING OPERATION)

IMAGING OBJECT TRACKING ALGORITHM (pan)

FIG. 13 VARIATION OF GAIN WHEN PANNING IS STARTED

VARIATION OF GAIN WHEN PAN IS STOPPED

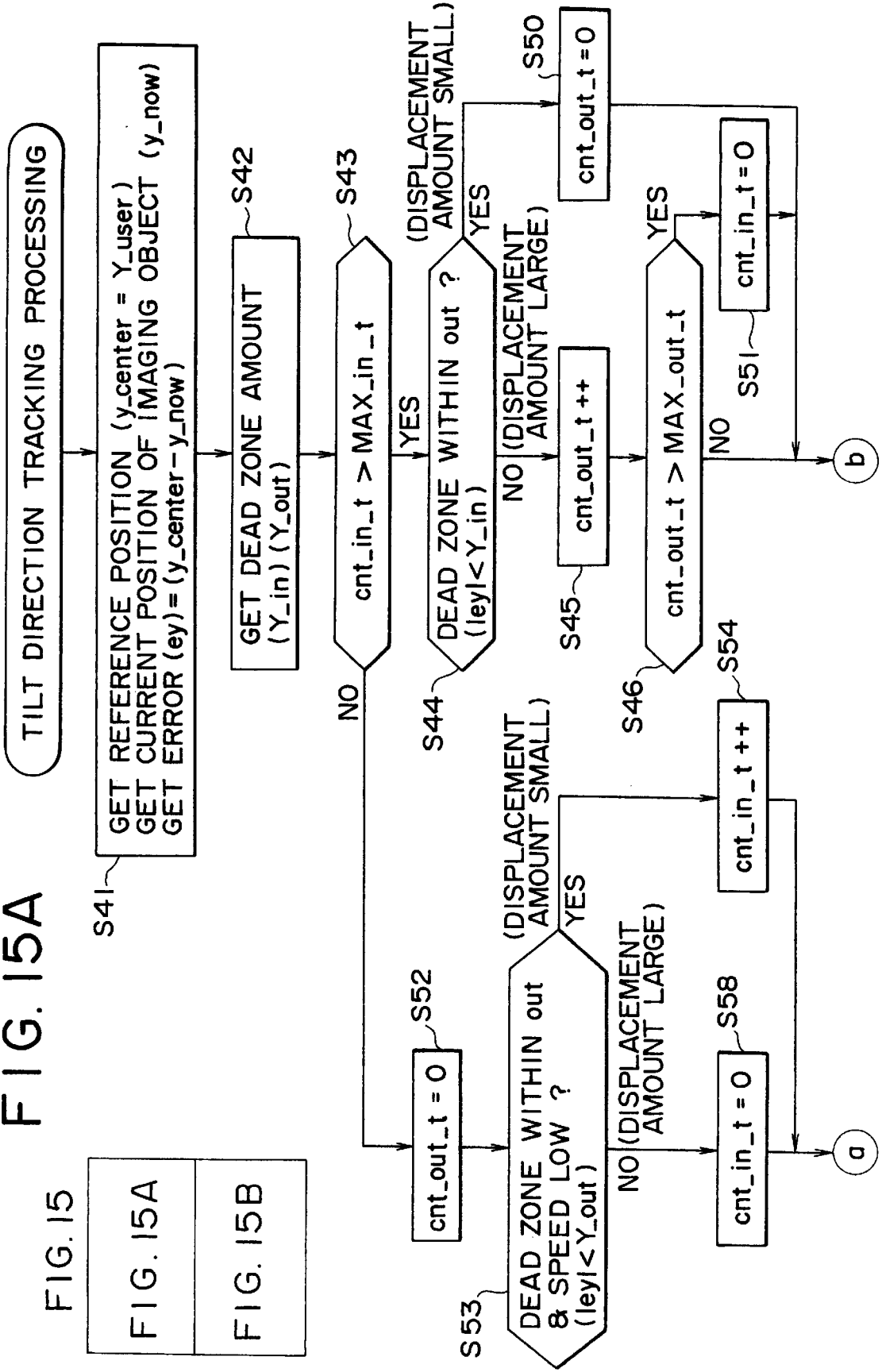

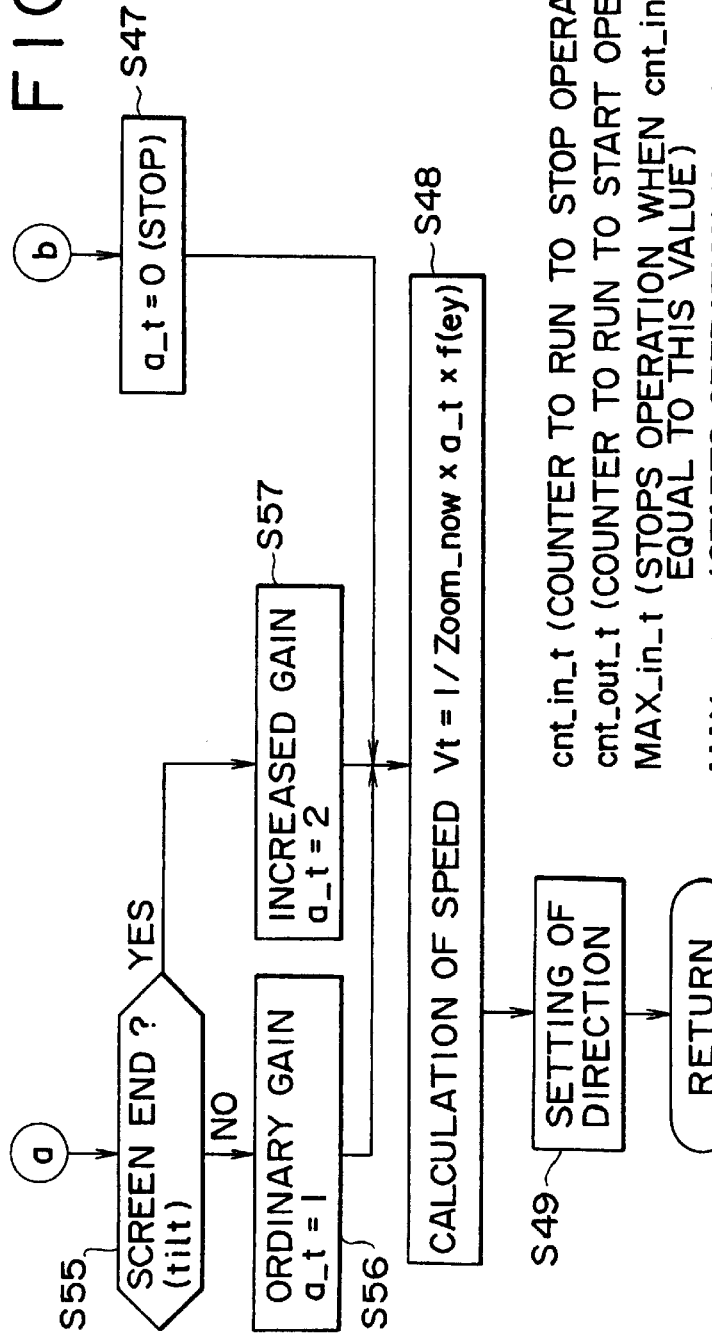

FIG. 16A
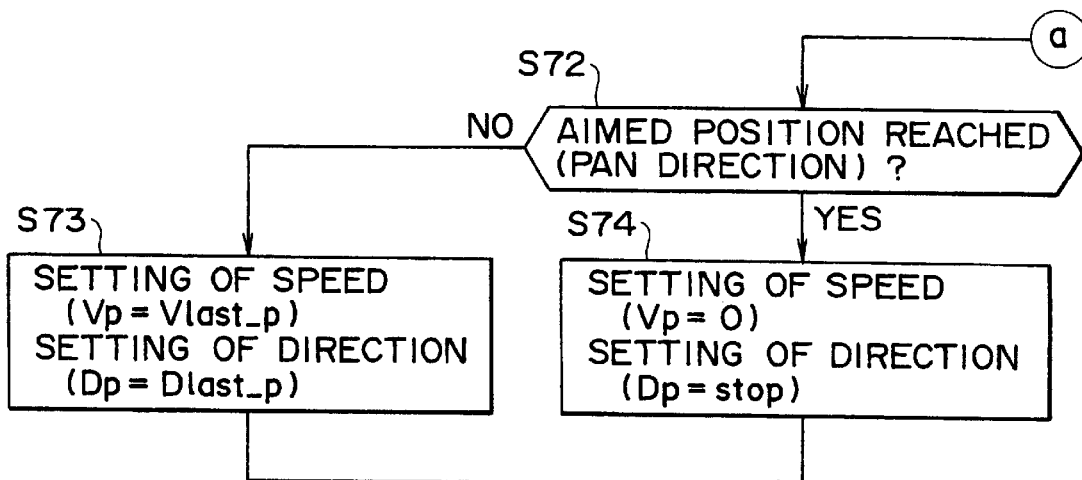
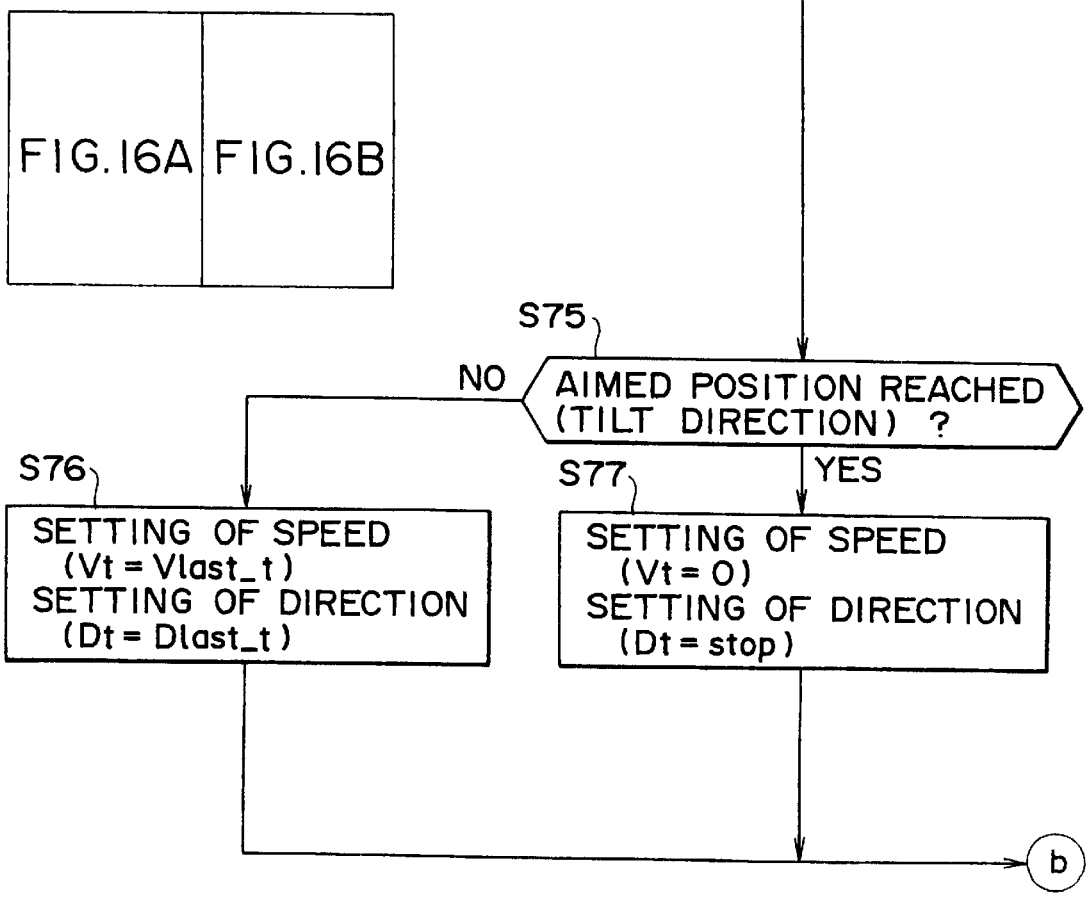

(X,Y) DENOTES MEMORY SIZE (Pwide, Twide) DENOTES DISTANCE ON PAN TILTER BETWEEN ENDS OF ANGLE OF VIEW AT Wide END (Zoom POSITION)

FIG. 20

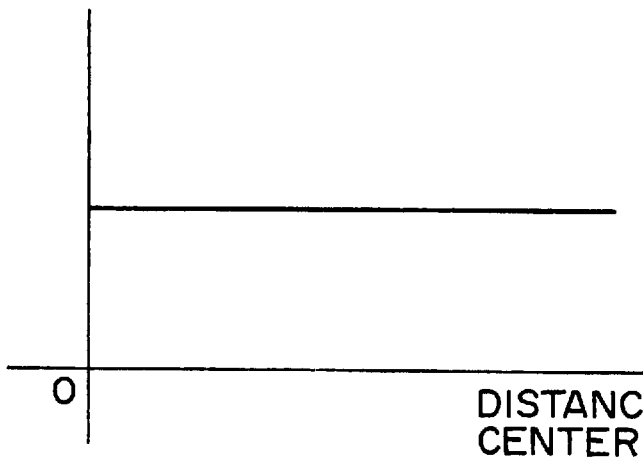

GAIN a_pan, a_tilt

DISTANCE ex, ey BETWEEN CENTER OF PULL-IN ON ANGLE OF VIEW AND IMAGING OBJECT a_pan AND a_tilt HAVE FIXED VALUES IN ANY STATE ex = x center − x now
speed_pan = a_pan × f(ex)
ey = y center − y now
speed_tilt = a_tilt × f(ey)

(x center, y center) DENOTES COORDINATES OF CENTER OF PULL-IN (x now, y now) DENOTES CURRENT COORDINATES OF IMAGING OBJECT f( ) DENOTES FUNCTION FOR SPEED CALCULATION

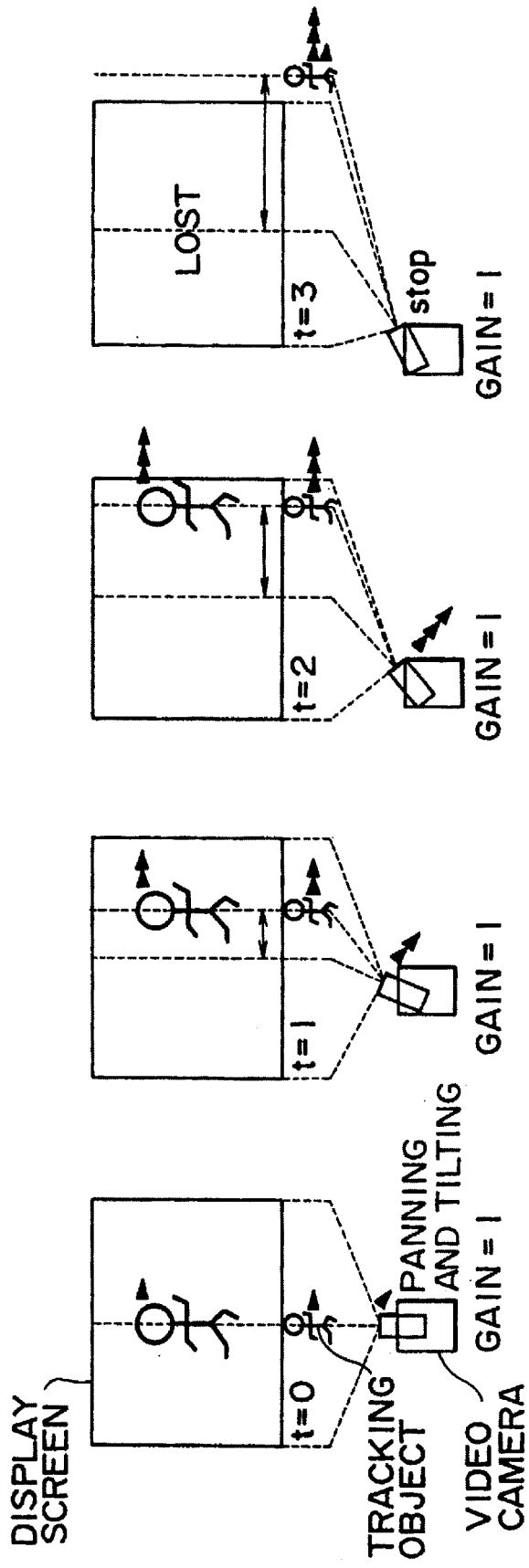

TRACKING APPARATUS AND TRACKING METHOD

BACKGROUND OF THE INVENTION

1. Field of the Invention

This invention relates to a tracking apparatus and a tracking method, and more particularly to a tracking apparatus and a tracking method suitable for use, for example, with a video camera which tracks and images a predetermined imaging object.

2. Description of the Related Art

A video camera system has already been proposed wherein a pan driving mechanism and a tilt driving mechanism are used to cause a video camera to automatically track an imaging object as an object of tracking to effect automatic tracking so that the imaging object may be displayed at a central location of a display screen.

In a video camera system of the type described above, for example, a reference measurement frame is provided at a central location of a display screen (image photographed or imaged by a video camera) as seen in FIG. 19, and imaging is performed so that the imaging object as an object of tracking may be included in the reference measurement frame and the thus imaged image is stored into a memory. Thereafter, the display screen is scanned with a frame (hereinafter referred to suitably as detection measurement frame) same as the reference measurement frame, and data at different positions in the detection measurement frame are compared with the stored data in the reference measurement frame. Then, a position in the detection measurement frame at which data most similar to data in the reference measurement frame such as, for example, coordinates of a point at which the center of gravity of the detection measurement frame is positioned are detected as a position of the imaging object. Then, a displacement amount which is a distance from the position of the imaging object to the position of the reference measurement frame as a position of a reference for pull-in in the display screen such as, for example, coordinates of a point at which the center of gravity of the reference measurement frame is positioned (coordinates of the center of pull-in) are calculated. Further, the video camera is panned and tilted based on the displacement amount so that the imaging object may be pulled in to a central location of the display screen.

The panning and tilting speeds in this instance are determined in the following manner. In particular, where the coordinates of the reference position are represented by $(X_{center}, Y_{center})$ and the coordinates of the position of the imaging object are represented by $(x_{now}, Y_{now})$, the displacement amounts ex and ey in the panning or horizontal direction and the tilting or vertical direction are respectively calculated in accordance with the following expressions:

$$ex = x_{center} - x_{now}$$
$$ey = y_{center} - y_{now} \quad (1)$$

The panning and tilting speeds, speed_pan and speed_tilt are then respectively calculated in accordance with the following expressions:

$$\text{speed\_pan} = a\_pan \times f(ex)$$
$$\text{speed\_tilt} = a\_tilt \times f(ey) \quad (2)$$

where a_pan and a_tilt are the gains when the pan driving mechanism and the tilt driving mechanism are driven, respectively, and f() is the function for calculation of a speed.

By the way, in such a video camera system as described above, the gains a_pan and a_tilt (each of the gains may be hereinafter referred to suitably as gain a) are fixed values independent of the displacement amounts ex and ey (each of the displacement amounts may be hereinafter referred to suitably as displacement amount e) as seen in FIG. 20. Accordingly, since the speed of panning or tilting is determined based only on the displacement amount e from the expressions (2) above, an imaging object is sometimes missed if it moves, for example, in the proximity of an end of the display screen, that is, in the proximity of the screen frame as seen in FIG. 21, in a direction toward the outside of the display screen at a higher speed than the panning or tilting speed.

When the imaging object is missed in this manner, it is re-detected (prediction tracked) by a method wherein a range in which the imaging object may be present is predicted from a movement of the imaging object before it is missed and panning and/or tilting are performed so that the video camera may image within the predicted range.

However, when a moving imaging object stops, for example, at a position behind a body such as a tree or a pole, if the range in which the imaging object may be present is predicted, using the method described above, from the movement of the imaging object before it is missed, then it is predicted that the imaging object is present ahead of the tree or the pole. Accordingly, it is difficult to find the imaging object using the method described above.

Further, where the gain and the speed of panning or tilting are determined in such a manner as described above, if a displacement amount e is produced, then tracking of the imaging object is started immediately. Accordingly, if the imaging object does not move but merely oscillates, when a displacement amount is produced by the oscillations, panning and/or tilting are performed. Consequently, also an image obtained by imaging exhibits oscillations, and this gives rise to a problem that the image lacks in stability.

Further, where such a video camera system as described above is applied, for example, to a television telephone system or a television conference system so that an image obtained by tracking an imaging object is compression coded and transmitted to a remote location, when the imaging object moves continuously, also the background of the image obtained by tracking the imaging object varies continuously. This gives rise to another problem in that the coding efficiency is deteriorated.

Further, while the video camera system is constructed such that, as described above, the position of the reference measurement frame provided at the central location of the display screen is set as the reference position for pull-in and accordingly panning and tilting are performed so that an imaging object being tracked may be pulled in to the central location of the display screen, depending upon a situation in use, a user may desire to perform tracking so that an imaging object may be pulled in to some other location of the display screen. However, with the video camera system described above, it is difficult to cope with such a case.

Further, when, for example, a certain person is determined as an object of tracking and tracking is started imaging the face of the person in the reference measurement frame, if some other person is present in the neighborhood, then tracking is sometimes performed recognizing the second person as a person to be tracked in error. In such an instance, with the video camera described above, it is required to first perform an operation to interrupt the tracking and then perform manual panning and/or tilting so that the face of the first person may be imaged in the reference measurement frame again. In this manner, the video camera has a still further problem in that complicated operations are required.

SUMMARY OF THE INVENTION

It is an object of the present invention to provide a tracking apparatus and a tracking method which are superior in follow-up performance to an imaging object, stability, adaptability to another apparatus and operability.

In order to attain the object described above, according to an aspect of the present invention, there is provided a tracking apparatus for tracking an imaging object, including imaging means for imaging the imaging object, driving means for driving the imaging means to perform panning and tilting, position detection means for detecting a position of the imaging object in an image outputted from the imaging means, automatic tracking means for calculating a displacement amount between the position of the imaging object detected by the position detection means and a reference position in the image outputted from the imaging means and controlling the driving means based on the displacement amount so that the position of the imaging object may coincide with the reference position to automatically track the imaging object, and reference position setting means for setting the reference position.

In the tracking apparatus, the imaging means images an imaging object, and the driving means drives the imaging means to perform panning and tilting. The position detection means detects a position of the imaging object in an image outputted from the imaging means, and the automatic tracking means calculates a displacement amount between the position of the imaging object detected by the position detection means and a reference position in the image outputted from the imaging means and controls the driving means based on the displacement amount so that the position of the imaging object may coincide with the reference position to automatically track the imaging object. The reference position setting means sets the reference position.

According to another aspect of the present invention, there is provided a tracking method for a tracking apparatus which includes imaging means for imaging an imaging object, driving means for driving the imaging means to perform panning and tilting, position detection means for detecting a position of the imaging object in an image outputted from the imaging means, and automatic tracking means for calculating a displacement amount between the position of the imaging object detected by the position detection means and a reference position in the image outputted from the imaging means and controlling the driving means based on the displacement amount so that the position of the imaging object may coincide with the reference position to automatically track the imaging object, wherein the reference position can be set to an arbitrary position in the image.

In the tracking method, a reference position can be set to an arbitrary position in an image.

With the tracking apparatus and the tracking method, since the reference position can be set to an arbitrary position in the image, the imaging object which is an object of tracking can be displayed at an arbitrary position.

According to a further aspect of the present invention, there is provided a tracking apparatus for tracking an imaging object, including imaging means for imaging the imaging object, driving means for driving the imaging means to perform panning and tilting, position detection means for detecting a position of the imaging object in an image outputted from the imaging means, automatic tracking means for controlling the driving means based on the position of the imaging object detected by the position detection means to automatically track the imaging object, discrimination means for discriminating whether or not the imaging object is present in the image outputted from the imaging means and outputting a result of the discrimination, and predictive tracking means for predicting, when a result of discrimination that the imaging object is not present in the image is outputted from the discrimination means, a range in which the imaging object may be present and controlling the driving means within the predicted range to predictively track the imaging object, the predictive tracking means predicting the range so that the position of the imaging object when the result of discrimination that the imaging object is not present in the image is outputted from the discrimination means may be included in the image outputted from the imaging means.

In the tracking apparatus, the imaging means images the imaging object, and the driving means drives the imaging means to perform panning and tilting. The position detection means detects a position of the imaging object in an image outputted from the imaging means, and the automatic tracking means controls the driving means based on the position of the imaging object detected by the position detection means to automatically track the imaging object. The discrimination means discriminates whether or not the imaging object is present in the image outputted from the imaging means and outputs a result of the discrimination, and the predictive tracking means predicts, when a result of discrimination that the imaging object is not present in the image is outputted from the discrimination means, a range in which the imaging object may be present and controls the driving means within the predicted range to predictively track the imaging object. In this instance, the predictive tracking means predicts the range so that the position of the imaging object when the result of discrimination that the imaging object is not present in the image is outputted from the discrimination means may be included in the image outputted from the imaging means.

According to a still further aspect of the present invention, there is provided a tracking method for a tracking apparatus which includes imaging means for imaging an imaging object, driving means for driving the imaging means to perform panning and tilting, position detection means for detecting a position of the imaging object in an image outputted from the imaging means, automatic tracking means for controlling the driving means based on the position of the imaging object detected by the position detection means to automatically track the imaging object, discrimination means for discriminating whether or not the imaging object is present in the image outputted from the imaging means and outputting a result of the discrimination, and predictive tracking means for predicting, when a result of discrimination that the imaging object is not present in the image is outputted from the discrimination means, a range in which the imaging object may be present and controlling the driving means within the predicted range to predictively track the imaging object, wherein the range is predicted so that the position of the imaging object when the result of discrimination that the imaging object is not present in the image is outputted from the discrimination means may be included in the image outputted from the imaging means.

In the tracking method, a range in which an imaging object may be present is predicted so that the position of the imaging object when a result of discrimination that the imaging object is not present in an image is outputted from the discrimination means may be included in the image outputted from the imaging means.

With the tracking method and the tracking apparatus, a range in which an imaging object may be present is predicted so that the position of the imaging object when a result of discrimination that the imaging object is not present in an image is outputted from the discrimination means may be included in the image outputted from the imaging means. Accordingly, even if the imaging object is missed, it can be caught comparatively quickly again.

According to a yet further aspect of the present invention, there is provided a tracking apparatus for tracking an imaging object, including imaging means for imaging the imaging object, driving means for driving the imaging means to perform panning and tilting, position detection means for detecting a position of the imaging object in an image outputted from the imaging means, automatic tracking means for controlling the driving means based on the position of the imaging object detected by the position detection means to automatically track the imaging object, and gain setting means for setting, based on the position of the imaging object detected by the position detection means, a gain to be used when the driving means drives the imaging means to perform panning and tilting, the automatic tracking means controlling the driving means based on the gain set by the gain setting method.

In the tracking apparatus, the imaging means images an imaging object, and the driving means drives the imaging means to perform panning and tilting. The position detection means detects a position of the imaging object in an image outputted from the imaging means, and the automatic tracking means controls the driving means based on the position of the imaging object detected by the position detection means to automatically track the imaging object. The gain setting means sets, based on the position of the imaging object detected by the position detection means, a gain to be used when the driving means drives the imaging means to perform panning and tilting. In this instance, the automatic tracking means controls the driving means based on the gain set by the gain setting method.

According to a yet further aspect of the present invention, there is provided a tracking method for a tracking apparatus which includes imaging means for imaging an imaging object, driving means for driving the imaging means to perform panning and tilting, position detection means for detecting a position of the imaging object in an image outputted from the imaging means, and automatic tracking means for controlling the driving means based on the position of the imaging object detected by the position detection means to automatically track the imaging object, wherein the gain to be used when the driving means drives the imaging means to perform panning and tilting is set based on the position of the imaging object detected by the position detection means, and the automatic tracking means controls the driving means based on the gain.

In the tracking method, the gain to be used when the driving means drives the imaging means to perform panning and tilting is set based on the position of the imaging object detected by the position detection means, and the automatic tracking means controls the driving means based on the gain.

With the tracking apparatus and the tracking method, the gain to be used when the driving means drives the imaging means to perform panning and tilting is set based on the position of the imaging object detected by the position detection means, and the driving means is controlled based on the gain by the automatic tracking means. Accordingly, the imaging object can be prevented from being missed.

According to a yet further aspect of the present invention, there is provided a tracking apparatus for tracking an imaging object, including imaging means for imaging the imaging object, driving means for driving the imaging means to perform panning and tilting, position detection means for detecting a position of the imaging object in an image outputted from the imaging means, automatic tracking means for calculating a displacement amount between the position of the imaging object detected by the position detection means and a reference position in the image outputted from the imaging means and controlling the driving means based on the displacement amount so that the position of the imaging object may coincide with the reference position to automatically track the imaging object, and displacement amount setting means for setting a control start displacement amount or a control stop displacement amount to be used as the displacement amount when the automatic tracking means is to start or stop control of the driving means, the automatic tracking means starting or stopping the control of the driving means based on the control start displacement amount or the control stop displacement amount set by the displacement amount setting means.

In the tracking apparatus, the imaging means images the imaging object, and the driving means drives the imaging means to perform panning and tilting. The position detection means detects a position of the imaging object in an image outputted from the imaging means, and the automatic tracking means calculates a displacement amount between the position of the imaging object detected by the position detection means and a reference position in the image outputted from the imaging means and controlling the driving means based on the displacement amount so that the position of the imaging object may coincide with the reference position to automatically track the imaging object. The displacement amount setting means sets a control start displacement amount or a control stop displacement amount to be used as the displacement amount when the automatic tracking means is to start or stop control of the driving means. In this instance, the automatic tracking means starts or stops the control of the driving means based on the control start displacement amount or the control stop displacement amount set by the displacement amount setting means.

According to a yet further aspect of the present invention, there is provided a tracking method for a tracking apparatus which includes imaging means for imaging an imaging object, driving means for driving the imaging means to perform panning and tilting, position detection means for detecting a position of the imaging object in an image outputted from the imaging means, and automatic tracking means for calculating a displacement amount between the position of the imaging object detected by the position detection means and a reference position in the image outputted from the imaging means and controlling the driving means based on the displacement amount so that the position of the imaging object may coincide with the reference position to automatically track the imaging object, wherein a control start displacement amount or a control stop displacement amount to be used as the displacement amount when the automatic tracking means is to start or stop control of the driving means is set, and the control of the driving means is started or stopped by the automatic tracking means based on the control start displacement amount or the control stop displacement amount.

In the tracking method, a control start displacement amount or a control stop displacement amount to be used as the displacement amount when the automatic tracking means is to start or stop control of the driving means is set, and the control of the driving means is started or stopped by the automatic tracking means based on the control start displacement amount or the control stop displacement amount set by the displacement amount setting means.

With the tracking apparatus and the tracking method, a control start displacement amount or a control stop displacement amount to be used as the displacement amount when the automatic tracking means is to start or stop control of the driving means is set, and the control of the driving means is started or stopped by the automatic tracking means based on the control start displacement amount or the control stop displacement amount set by the displacement amount setting means. Accordingly, oscillations of the image obtained by tracking the imaging object can be prevented.

According to a yet further aspect of the present invention, there is provided a tracking apparatus for tracking an imaging object, including imaging means for imaging the imaging object, driving means for driving the imaging means to perform panning and tilting, position detection means for detecting a position of the imaging object in an image outputted from the imaging means, automatic tracking means for controlling the driving means based on the position of the imaging object detected by the position detection means to automatically track the imaging object, manual operation means for manually operating the driving means, and supply means for compulsorily supplying, when the manual operation means is manually operated, a signal corresponding to the manual operation to the driving means.

In the tracking apparatus, the imaging means images the imaging object, and the driving means drives the imaging means to perform panning and tilting. The position detection means detects a position of the imaging object in an image outputted from the imaging means, and the automatic tracking means controls the driving means based on the position of the imaging object detected by the position detection means to automatically track the imaging object. The manual operation means is manually operated to manually operate the driving means, and the supply means compulsorily supplies, when the manual operation means is manually operated, a signal corresponding to the manual operation to the driving means.

According to a yet further aspect of the present invention, there is provided a tracking method for a tracking apparatus which includes imaging means for imaging an imaging object, driving means for driving the imaging means to perform panning and tilting, position detection means for detecting a position of the imaging object in an image outputted from the imaging means, automatic tracking means for controlling the driving means based on the position of the imaging object detected by the position detection means to automatically track the imaging object, and manual operation means for manually operating the driving means, wherein, when the manual operation means is manually operated, a signal corresponding to the manual operation is compulsorily supplied to the driving means.

In the tracking method, when the manual operation means is manually operated, a signal corresponding to the manual operation is compulsorily supplied to the driving means.

With the tracking apparatus and the tracking method, when the manual operation means is manually operated, a signal corresponding to the manual operation is compulsorily supplied to the driving means. Accordingly, even if, for example, another body is recognized in error as the imaging object to be tracked originally, manual operation can be performed readily so that the imaging object to be tracked originally may be pulled in.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 1 is a block diagram showing a construction of a video camera system to which the present invention is applied;

FIGS. 2A to 2C and 3A to 3C are diagrammatic views illustrating dead zone processing of a tracking driving amount calculation apparatus shown in FIG. 1;

FIGS. 4A to 4D are diagrammatic views illustrating setting of a pull-in position by a tracking pull-in position setting apparatus shown in FIG. 1;

FIGS. 5A to 5D are diagrammatic views illustrating processing of a gain promotion apparatus shown in FIG. 1;

FIGS. 8A to 8C and 9A to 9D are diagrammatic views illustrating processing of a predictive tracking apparatus shown in FIG. 1;

FIG. 15 is a flow chart illustrating details of operation in a step of the flow chart of FIG. 11;

FIG. 20 is a diagram illustrating a gain determination method; and

FIG. 21 is a schematic view illustrating that an imaging object is missed in the proximity of an end portion of a display screen or screen frame.

DESCRIPTION OF THE PREFERRED EMBODIMENT

Figure 6:
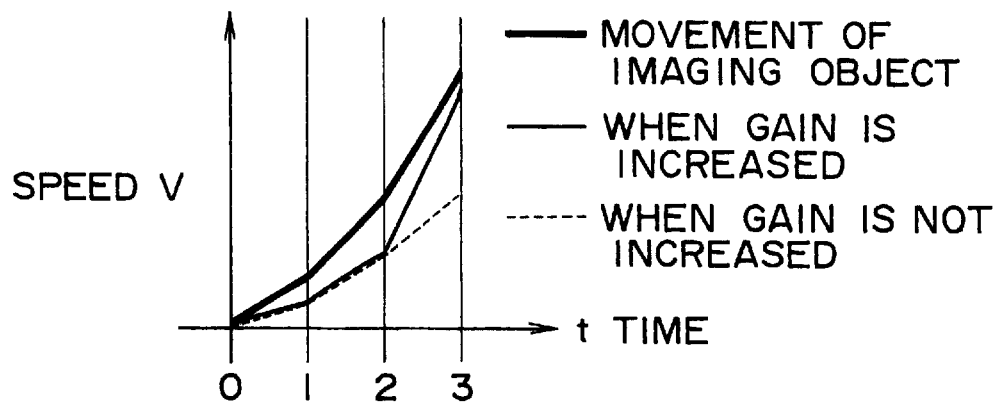
FIG. 6 is a diagram illustrating a variation of the speed of panning or tilting when the gain is varied.

Before a preferred embodiment of the present invention is described, in order to clearly indicate a corresponding relationship between various features of the invention set forth in the claims and the embodiment described hereinbelow, characteristics of the present invention will be described below with corresponding features of the embodiment, which are mere examples, added in parentheses thereto.

In particular, a tracking apparatus for tracking an imaging object includes imaging means (for example, a lens block 1 shown in FIG. 1 and so forth) for imaging the imaging object, driving means (for example, a panning and tilting driving mechanism 25 and motors 26 and 27 shown in FIG.

1 and so forth) for driving the imaging means to perform panning and tilting, position detection means (for example, an imaging object position detection apparatus 15 shown in FIG. 1 and so forth) for detecting a position of the imaging object in an image outputted from the imaging means, automatic tracking means (for example, a tracking driving amount calculation apparatus 16 shown in FIG. 1 and so forth) for calculating a displacement amount between the position of the imaging object detected by the position detection means and a reference position in the image outputted from the imaging means and controlling the driving means based on the displacement amount so that the position of the imaging object may coincide with the reference position to automatically track the imaging object, and reference position setting means (for example, a tracking pull-in position setting apparatus 19 shown in FIG. 1 and so forth) for setting the reference position.

According to claim 2, a tracking method for a tracking apparatus which includes imaging means (for example, the lens block 1 shown in FIG. 1 and so forth) for imaging an imaging object, driving means (for example, the panning and tilting driving mechanism 25 and the motors 26 and 27 shown in FIG. 1 and so forth) for driving the imaging means to perform panning and tilting, position detection means (for example, the imaging object position detection apparatus 15 shown in FIG. 1 and so forth) for detecting a position of the imaging object in an image outputted from the imaging means, and automatic tracking means (for example, the tracking driving amount calculation apparatus 16 shown in FIG. 1 and so forth) for calculating a displacement amount between the position of the imaging object detected by the position detection means and a reference position in the image outputted from the imaging means and controlling the driving means based on the displacement amount so that the position of the imaging object may coincide with the reference position to automatically track the imaging object, is constructed such that the reference position can be set to an arbitrary position in the image.

A tracking apparatus for tracking an imaging object includes imaging means (for example, the lens block 1 shown in FIG. 1 and so forth) for imaging the imaging object, driving means (for example, the panning and tilting driving mechanism 25 and the motors 26 and 27 shown in FIG. 1 and so forth) for driving the imaging means to perform panning and tilting, position detection means (for example, the imaging object position detection apparatus 15 shown in FIG. 1 and so forth) for detecting a position of the imaging object in an image outputted from the imaging means, automatic tracking means (for example, the tracking driving amount calculation apparatus 16 shown in FIG. 1 and so forth) for controlling the driving means based on the position of the imaging object detected by the position detection means to automatically track the imaging object, discrimination means (for example, an imaging object presence detection apparatus 14 shown in FIG. 1 and so forth) for discriminating whether or not the imaging object is present in the image outputted from the imaging means and outputting a result of the discrimination, and predictive tracking means (for example, a predictive tracking apparatus 21 shown in FIG. 1 and so forth) for predicting, when a result of discrimination that the imaging object is not present in the image is outputted from the discrimination means, a range in which the imaging object may be present and controlling the driving means within the predicted range to predictively track the imaging object, the predictive tracking means predicting the range so that the position of the imaging object when the result of discrimination that the imaging object is not present in the image is outputted from the discrimination means may be included in the image outputted from the imaging means.

A tracking method for a tracking apparatus which includes imaging means (for example, the lens block 1 shown in FIG. 1 and so forth) for imaging an imaging object, driving means (for example, the panning and tilting driving mechanism 25 and the motors 26 and 27 shown in FIG. 1 and so forth) for driving the imaging means to perform panning and tilting, position detection means (for example, the imaging object position detection apparatus 15 shown in FIG. 1 and so forth) for detecting a position of the imaging object in an image outputted from the imaging means, automatic tracking means (for example, the tracking driving amount calculation apparatus 16 shown in FIG. 1 and so forth) for controlling the driving means based on the position of the imaging object detected by the position detection means to automatically track the imaging object, discrimination means (for example, the imaging object presence detection apparatus 14 shown in FIG. 1 and so forth) for discriminating whether or not the imaging object is present in the image outputted from the imaging means and outputting a result of the discrimination, and predictive tracking means (for example, a predictive tracking apparatus 21 shown in FIG. 1 and so forth) for predicting, when a result of discrimination that the imaging object is not present in the image is outputted from the discrimination means, a range in which the imaging object may be present and controlling the driving means within the predicted range to predictively track the imaging object, is constructed such that the range is predicted so that the position of the imaging object when the result of discrimination that the imaging object is not present in the image is outputted from the discrimination means may be included in the image outputted from the imaging means.

A tracking apparatus for tracking an imaging object includes imaging means (for example, the lens block 1 shown in FIG. 1 and so forth) for imaging the imaging object, driving means (for example, the panning and tilting driving mechanism 25 and the motors 26 and 27 shown in FIG. 1 and so forth) for driving the imaging means to perform panning and tilting, position detection means (for example, the imaging object position detection apparatus 15 shown in FIG. 1 and so forth) for detecting a position of the imaging object in an image outputted from the imaging means, automatic tracking means (for example, the tracking driving amount calculation apparatus 16 shown in FIG. 1 and so forth) for controlling the driving means based on the position of the imaging object detected by the position detection means to automatically track the imaging object, and gain setting means (for example, a gain promotion apparatus 20 shown in FIG. 1 and so forth) for setting, based on the position of the imaging object detected by the position detection means, a gain to be used when the driving means drives the imaging means to perform panning and tilting, the automatic tracking means controlling the driving means based on the gain set by the gain setting method.

A tracking method for a tracking apparatus which includes imaging means (for example, the lens block 1 shown in FIG. 1 and so forth) for imaging an imaging object, driving means (for example, the panning and tilting driving mechanism 25 and the motors 26 and 27 shown in FIG. 1 and so forth) for driving the imaging means to perform panning and tilting, position detection means (for example, the imaging object position detection apparatus 15 shown in FIG. 1 and so forth) for detecting a position of the imaging object in an image outputted from the imaging means, and automatic tracking means (for example, the tracking driving amount calculation apparatus 16 shown in FIG. 1 and so forth) for controlling the driving means based on the position of the imaging object detected by the position detection means to automatically track the imaging object, is constructed such that the gain to be used when the driving means drives the imaging means to perform panning and tilting is set based on the position of the imaging object detected by the position detection means, and the automatic tracking means controls the driving means based on the gain.

A tracking apparatus for tracking an imaging object includes imaging means (for example, the lens block 1 shown in FIG. 1 and so forth) for imaging the imaging object, driving means (for example, the panning and tilting driving mechanism 25 and the motors 26 and 27 shown in FIG. 1 and so forth) for driving the imaging means to perform panning and tilting, position detection means (for example, the imaging object position detection apparatus 15 shown in FIG. 1 and so forth) for detecting a position of the imaging object in an image outputted from the imaging means, automatic tracking means (for example, the tracking driving amount calculation apparatus 16 shown in FIG. 1 and so forth) for calculating a displacement amount between the position of the imaging object detected by the position detection means and a reference position in the image outputted from the imaging means and controlling the driving means based on the displacement amount so that the position of the imaging object may coincide with the reference position to automatically track the imaging object, and displacement amount setting means (for example, a dead zone amount selection apparatus 18 shown in FIG. 1 and so forth) for setting a control start displacement amount or a control stop displacement amount to be used as the displacement amount when the automatic tracking means is to start or stop control of the driving means, the automatic tracking means starting or stopping the control of the driving means based on the control start displacement amount or the control stop displacement amount set by the displacement amount setting means.

A tracking method for a tracking apparatus which includes imaging means (for example, the lens block 1 shown in FIG. 1 and so forth) for imaging an imaging object, driving means (for example, the panning and tilting driving mechanism 25 and the motors 26 and 27 shown in FIG. 1 and so forth) for driving the imaging means to perform panning and tilting, position detection means (for example, the imaging object position detection apparatus 15 shown in FIG. 1 and so forth) for detecting a position of the imaging object in an image outputted from the imaging means, and automatic tracking means (for example, the tracking driving amount calculation apparatus 16 shown in FIG. 1 and so forth) for calculating a displacement amount between the position of the imaging object detected by the position detection means and a reference position in the image outputted from the imaging means and controlling the driving means based on the displacement amount so that the position of the imaging object may coincide with the reference position to automatically track the imaging object, is constructed such that a control start displacement amount or a control stop displacement amount to be used as the displacement amount when the automatic tracking means is to start or stop control of the driving means is set, and the control of the driving means is started or stopped by the automatic tracking means based on the control start displacement amount or the control stop displacement amount.

A tracking apparatus for tracking an imaging object includes imaging means (for example, the lens block 1 shown in FIG. 1 and so forth) for imaging the imaging object, driving means (for example, the panning and tilting driving mechanism 25 and the motors 26 and 27 shown in FIG. 1 and so forth) for driving the imaging means to perform panning and tilting, position detection means (for example, the imaging object position detection apparatus 15 shown in FIG. 1 and so forth) for detecting a position of the imaging object in an image outputted from the imaging means, automatic tracking means (for example, the tracking driving amount calculation apparatus 16 shown in FIG. 1 and so forth) for controlling the driving means based on the position of the imaging object detected by the position detection means to automatically track the imaging object, manual operation means (for example, a manual imaging object search apparatus 23 shown in FIG. 1 and so forth) for manually operating the driving means, and supply means (for example, a driving method selection apparatus 24 shown in FIG. 1 and so forth) for compulsorily supplying, when the manual operation means is manually operated, a signal corresponding to the manual operation to the driving means.

A tracking method for a tracking apparatus which includes imaging means (for example, the lens block 1 shown in FIG. 1 and so forth) for imaging an imaging object, driving means (for example, the panning and tilting driving mechanism 25 and the motors 26 and 27 shown in FIG. 1 and so forth) for driving the imaging means to perform panning and tilting, position detection means (for example, the imaging object position detection apparatus 15 shown in FIG. 1 and so forth) for detecting a position of the imaging object in an image outputted from the imaging means, (for example, the tracking driving amount calculation apparatus 16 shown in FIG. 1 and so forth) automatic tracking means for controlling the driving means based on the position of the imaging object detected by the position detection means to automatically track the imaging object, and manual operation means (for example, the manual imaging object search apparatus 23 shown in FIG. 1 and so forth) for manually operating the driving means, is constructed such that, when the manual operation means is manually operated, a signal corresponding to the manual operation is compulsorily supplied to the driving means.

It is to be noted that naturally the foregoing description does not signify that the individual means are limited to those described above.

FIG. 1 shows a construction of a video camera system (VCS) to which the present invention is applied. A lens block 1 is composed of a lens 2, an iris 3 and a charge coupled device (CCD) 4, and images light LA from an imaging object and outputs an image signal in the form of an electric signal. In particular, the light LA from the imaging object is focused on the CCD 4 by the lens 2 to form an image. Consequently, an image signal corresponding to a received light amount then is outputted from the CCD 4.

The iris 3 constructs an automatic iris (AE) mechanism and adjusts the amount of light to be received by the CCD 4 to a suitable value to place the exposure state of the lens block 1 into a suitable state.

The image signal outputted from the lens block 1 is sample held by a sample hold (S/H)/automatic gain control circuit (AGC) 5 and is then gain controlled in response to a control signal from the automatic iris mechanism so that it may have a predetermined gain, whereafter it is outputted to an A/D converter 6.

The A/D converter 6 performs A/D conversion of an image signal in the form of an analog signal from the sample hold/automatic gain control circuit 5 in response to a predetermined clock signal to form a digital image signal. The image signal obtained as a digital signal by the A/D converter 6 is outputted to a brightness/color difference signal production circuit 7 and an outputting apparatus 28.

The brightness/color difference signal production circuit 7 produces, based on the image signal from the A/D converter 6, a brightness signal Y and color difference signals R-Y and B-Y of each of pixels which form a screen corresponding to the image signal and outputs them to an image primary storage apparatus 8.

The image primary storage apparatus 8 includes a pre-processing section 9 and a frame memory 10. The pre-processing section 9 samples out pixels forming an image, for example, by filtering the brightness signal Y an the color difference signals R-Y and B-Y from the brightness/color different signal production apparatus 7 to convert the image supplied from the A/D converter 6 via the brightness/color different signal production apparatus 7 into another image of a predetermined number of pixels such as, for example, an image of 48 pixels×32 rows, that is, 48×32 pixels. The brightness signal Y and the color difference signals R-Y and B-Y of the pixels which form the image produced by the sampling out processing by the pre-processing section 9 are supplied to and stored into the frame memory 10. In particular, the frame memory 10 includes image memories 1A, 10B and 10C for storing the brightness signal Y and the color difference signals R-Y and B-Y, respectively. Consequently, the brightness signal Y and the color difference signals R-Y and B-Y from the pre-processing section 9 are stored into the image memories 10A to 10C, respectively.

An image imaged by the lens block 1 is stored into the image memories 10A to 10C in such a manner as described above. Thereafter, the stored contents of the image memories 10A to 10C are successively rewritten with images successively outputted from the lens block 1, for example, in units of a frame or in units of a field.

A detection imaging object setting apparatus 13 is manually operated to start tracking of an imaging object. In particular, if the video camera system (lens block 1) is controlled so that an imaging object as an object to be tracked may be imaged, for example, in such a reference measurement frame as described hereinabove and then the detection imaging object setting apparatus 13 is manually operated to start a tracking operation, then the detection imaging object setting apparatus 13 reads out and stores image data, that is, the brightness signal Y and the color difference signals R-Y and B-Y stored in the frame memory 10 then, or in other words, image data with which the imaging object as an object of tracking is displayed in the reference measurement frame.

When the detection imaging object setting apparatus 13 is manually operated to start a tracking operation, an imaging object presence detection apparatus 14 reads out image data from the detection imaging object setting apparatus 13 and the frame memory 10 and compares the thus read out image data with each other to discriminate whether or not an imaging object is present in the image stored in the frame memory 10. Then, the imaging object presence detection apparatus 14 outputs a result of the discrimination to an imaging object position detection apparatus 15, a tracking driving amount calculation apparatus 16 and a predictive tracking apparatus 21. A discrimination result that an imaging object is present in the image stored in the frame memory 10 and another discrimination result that an imaging object is not present in the image will be hereinafter referred to suitably as imaging object presence discrimination and imaging object absence discrimination, respectively.

The imaging object position detection apparatus 15 detects, when the imaging object presence discrimination is received from the imaging object presence detection apparatus 14, a position or address on the frame memory 10 at which the imaging object is present (such position will be hereinafter referred to suitably as imaging object position). Then, the imaging object position detection apparatus 15 outputs the detected imaging object position to the tracking driving amount calculation apparatus 16, a gain promotion apparatus 20 and the predictive tracking apparatus 21.

It is to be noted that a method of discriminating whether or not an imaging object is present in an image stored in a frame memory such as the frame memory 10 and a method of detecting the position of the imaging object are disclosed in detail, for example, in Japanese Patent Application No. Heisei 5-197040 applied for patent in Japan by the same assignee as that of the present invention.

The tracking driving amount calculation apparatus 16 performs automatic tracking control of an imaging object while it receives imaging object presence discrimination from the imaging object presence detection apparatus 14. In particular, the tracking driving amount calculation apparatus 16 calculates a displacement amount between an imaging object position from the imaging object position detection apparatus 15 and a predetermined reference position in an image imaged by the lens block 1 (such reference position will be hereinafter referred to suitably as pull-in position). Then, the tracking driving amount calculation apparatus 16 produces based on the calculated displacement amount and outputs a control signal for automatically tracking the imaging object, that is, a control signal for performing panning and/or tilting so that the imaging object position may coincide with the pull-in position. This control signal is supplied to a driving method selection apparatus 24. It is to be noted that production of a control signal by the tracking driving amount calculation apparatus 16 is based not only the displacement amount but also on outputs of a zoom position detection apparatus 17, a dead zone amount selection apparatus 18, a tracking pull-in position setting apparatus 19 and the gain promotion apparatus 20 which will be hereinafter described.

The zoom position detection apparatus 17 detects a zoom position of a zoom lens (not shown) included in the lens 2 and outputs zoom information representative of the zoom position to the tracking driving amount calculation apparatus 16 and the predictive tracking apparatus 21. In particular, the lens 2 includes a zoom lens which is driven by a motor not shown, and the zoom position detection apparatus 17 detects the zoom position of the zoom lens, for example, by means of a potentiometer which operates in association with the zoom lens. It is to be noted that, in the present embodiment, the zoom information exhibits, for example, a higher value as the zoom lens moves in a zoom-up direction with respect to a reference position at which the zoom lens is at the widest side position (at the lowest magnification position). For example, the zoom information exhibits the value 1 when the zoom lens is at the widest side position, and as zooming up proceeds, the zoom information exhibits an increasing value in accordance with the degree of the zooming up.

The dead zone amount selection apparatus 18 is manually operated to set a control start displacement amount or a control stop displacement amount which is a magnitude (absolute value) in displacement amount when control for panning and/or tilting is started or stopped. The control start displacement amount or control stop displacement amount (such displacement amount will be hereinafter referred to suitably as dead zone amount) set by manual operation of the dead zone amount selection apparatus 18 is outputted to the tracking driving amount calculation apparatus 16. The tracking driving amount calculation apparatus 16 here is constructed such that, where a dead zone amount is set by manual operation of the dead zone amount selection apparatus 18, the tracking driving amount calculation apparatus 16 starts or stops control for panning and/or tilting when the displacement amount becomes larger or smaller than the dead zone amount.

The tracking pull-in position setting apparatus 19 is manually operated to set a pull-in position. When a pull-in position is set by manual operation of the tracking pull-in position setting apparatus 19, the tracking driving amount calculation apparatus 16 performs control of panning and/or tilting so that an imaging object may be pulled in to the pull-in position. However, if setting of a pull-in position by manual operation of the tracking pull-in position setting apparatus 19 has not been performed, then the pull-in position is set to a predetermined default position such as, for example, the position of the center of gravity of an image imaged by the lens block 1.

The gain promotion apparatus 20 sets, based on an imaging object position from the imaging object position detection apparatus 15, a gain to be used to detect a speed when panning and/or tilting are to be performed, and outputs the thus set gain to the tracking driving amount calculation apparatus 16.

The predictive tracking apparatus 21 performs predictive tracking control of an imaging object when imaging object absence discrimination is received from the imaging object presence detection apparatus 14. In particular, when imaging object absence discrimination is received from the imaging object presence detection apparatus 14, the predictive tracking apparatus 21 predicts a range in which the imaging object may be present based on an imaging object position received from the imaging object position detection apparatus 15, zoom information from the zoom position detection apparatus 17 and an output of a panning and tilting position detection apparatus 22 which will be hereinafter described. Then, the predictive tracking apparatus 21 produces and outputs a control signal for performing panning and/or tilting so that imaging within the predicted range may be performed. This control signal is supplied to the driving method selection apparatus 24.

The panning and tilting position detection apparatus 22 detects and outputs the speed, direction, position and so forth of panning and/or tilting to the predictive tracking apparatus 21. A manual imaging object search apparatus 23 is manually operated when panning and/or tilting are to be performed manually. An operation signal corresponding to manual operation of the manual imaging object search apparatus 23 is outputted to the driving method selection apparatus 24.

The driving method selection apparatus 24 selects a control signal outputted from the tracking driving amount calculation apparatus 16 or the predictive tracking apparatus 21 and supplies the selected control signal to a panning and tilting driving apparatus 25 when imaging object presence discrimination or imaging object absence discrimination is outputted from the imaging object presence detection apparatus 14. However, even when one of imaging object presence discrimination and imaging object absence discrimination is outputted from the imaging object presence detection apparatus 14, if an operation signal is received from the driving method selection apparatus 24, the driving method selection apparatus 24 compulsorily selects the operation signal and outputs it to the panning and tilting driving apparatus 25.

The panning and tilting driving apparatus 25 drives a motor 26 for performing panning and a motor 27 for performing tilting in response to signals from the driving method selection apparatus 24 to drive the lens block 1 (or the entire video camera system) so as to perform panning and tilting.

The outputting apparatus 28 includes, for example, a digital to analog converter, a display unit and so forth, and converts an image signal from the A/D converter 6 from a digital signal into an analog signal and displays it. Further, the outputting apparatus 28 includes, for example, a compression coding apparatus, a transmission apparatus and so forth, and compression codes an image signal from the A/D converter 6 and transmits it to a remote location.

In the video camera system having the construction described above, if an imaging object as an object of tracking is displayed in such a reference measurement frame as described hereinabove and the detection imaging object setting apparatus 13 is manually operated to start a tracking operation, then the detection imaging object setting apparatus 13 reads out and stores image data stored in the frame memory 10 then.

Then, the imaging object presence detection apparatus 14 discriminates whether or not the imaging object is substantially present in the display screen formed in the frame memory 10 (the image stored in the frame memory 10). A result of the discrimination is outputted to the imaging object position detection apparatus 15, the tracking driving amount calculation apparatus 16 and the predictive tracking apparatus 21.

When imaging object presence discrimination is outputted from the imaging object presence detection apparatus 14, the position of the imaging object is detected by the imaging object position detection apparatus 15 and outputted to the tracking driving amount calculation apparatus 16, the gain promotion apparatus 20 and the predictive tracking apparatus 21. The tracking driving amount calculation apparatus 16 calculates a displacement amount between the imaging object position from the imaging object position detection apparatus 15 and the pull-in position and produces, based on the displacement amount, a control signal for performing panning and/or tilting so that the imaging object position may coincide with the pull-in position. The control signal is outputted to the panning and tilting driving apparatus 25 via the driving method selection apparatus 24.

The panning and tilting driving apparatus 25 drives the motors 26 and 27 to rotate in accordance with the control signal from the tracking driving amount calculation apparatus 16 so that panning and/or tilting are performed. The imaging object is pulled in to the pull-in position and automatic tracking of the imaging object present in the display screen is performed in this manner.

When the imaging object is missed while such automatic tracking as described above is proceeding, imaging object absence discrimination is outputted from the imaging object presence detection apparatus 14. In this instance, the predictive tracking apparatus 21 predicts a range in which the imaging object may be present, and produces a control signal for performing panning and/or tilting so that imaging within the predicted range may be performed. The control signal is outputted to the panning and tilting driving apparatus 25 via the driving method selection apparatus 24. The panning and tilting driving apparatus 25 drives the motors 26 and 27 to rotate in accordance with the control signal from the predictive tracking apparatus 21. Consequently, panning and/or tilting are performed so that the lens block 1 may image the predicted range.

If the imaging object is caught within the display screen by such predictive tracking as described above, then imaging object presence discrimination becomes outputted from the imaging object presence detection apparatus 14, and automatic tracking by the tracking driving amount calculation apparatus 16 is performed again.

Subsequently, dead zone processing which is performed by the tracking driving amount calculation apparatus 16 in accordance with a dead zone amount (control start displacement amount or control stop displacement amount) set by manual operation of the dead zone amount selection apparatus 18.

As described hereinabove, where there is a displacement between the imaging object position and the pull-in position, panning and/or tilting are usually performed immediately based on the displacement amount, which sometimes makes an image outputted from the lens block 1 unstable.

In order to eliminate this, the tracking driving amount calculation apparatus 16 starts and stops automatic tracking control in accordance with a dead zone amount set by the dead zone amount selection apparatus 18. In particular, even if a displacement amount is produced, if the displacement amount remains within a control start displacement amount, the tracking driving amount calculation apparatus 16 does not start automatic tracking control, but if the displacement amount becomes larger than the control start displacement amount, then the tracking driving amount calculation apparatus 16 starts automatic tracking control. Further, after automatic tracking control is started, while the displacement amount remains larger than a control stop displacement amount, the tracking driving amount calculation apparatus 16 continues to perform the automatic tracking control, but if the displacement amount becomes smaller than the control stop displacement amount, the tracking driving amount calculation apparatus 16 stops the automatic tracking control. Since a dead zone in which the tracking driving amount calculation apparatus 16 does not react with a displacement amount is provided in this manner, for example, when the imaging object does not move but merely oscillates, panning or tilting is not performed. As a result, the image outputted from the lens block 1 can be prevented from being rendered unstable.

Further, in this instance, the background of the image outputted from the lens block 1 remains stationary. Consequently, otherwise possible deterioration in coding efficiency when the image is compression coded and transmitted can be prevented.

By the way, where an image outputted from the lens block 1 is compression coded and transmitted in this manner by the outputting apparatus 28, if the amount of the dead zone (shadowed portion in FIGS. 2A to 2C) is, for example, small as seen in FIG. 2, when the imaging object moves incessantly, panning and/or tilting are still performed incessantly as seen from FIGS. 2A to 2C. Accordingly, in this instance, also the background of the image outputted from the lens block 1 continuously moves in the opposite directions to the panning and/or tilting directions, which deteriorates the coding efficiency of the outputting apparatus 28.

Therefore, in such an instance, the dead zone amount selection apparatus 18 will be manually operated to increase the dead zone amount as seen, for example, from shadowed portions in FIGS. 3A to 3C. Where the dead zone amount is large in this manner, even if the imaging object moves from a position shown in FIG. 3A to another position shown in FIG. 3B, it remains within the dead zone (the displacement amount is smaller than the dead zone amount (control start displacement amount)), and consequently, panning or tilting is not performed. Then, if the imaging object thereafter moves from the position shown in FIG. 3B to a further position shown in FIG. 3C and goes out of the dead zone, panning and/or tilting are performed. Accordingly, in this instance, the period within which the background of the image outputted from the lens block 1 is shorter than that in the case of FIGS. 2A to 2C. As a result, otherwise possible deterioration of the coding efficiency of the outputting apparatus 28 can be reduced. Further, in this instance, also drop of the transmission rate can be reduced.

Subsequently, setting of a pull-in position by manual operation of the tracking pull-in position setting apparatus 19 will be described with reference to FIGS. 4A to 4D. When it is tried to track, for example, some person as seen in FIG. 4A, the face of the person is determined as an object of tracking and the center of the display screen is set as the pull-in position. Consequently, the tracking driving amount calculation apparatus 16 performs automatic tracking control so that the face of the person may be positioned at the center of the display screen. In particular, in this instance, where the horizontal and vertical lengths of the display screen are represented by X and Y, respectively, and the coordinates of the point of the left upper corner are represented by (0, 0) while the coordinates of the point of the right lower corner are represented by (X, Y), the pull-in position ($X_{center}$, $Y_{center}$) are given by (X/2, Y/2), and panning and/or tilting are performed so that the face of the person of the object of tracking may be pulled in to the position.

By the way, when such tracking is performed, if, for example, another person is present in the proximity of the person to be tracked as seen in FIG. 4B, it sometimes occurs that the face of the second person is recognized as the face of the person to be tracked in error. Such erroneous recognition arises in most cases where recognition of the face of the person is principally based on the color of the face, and if such erroneous recognition occurs, then the second person will be tracked. One of possible methods for eliminating this is to determine, where a person to be tracked wears, for example, clothes of a color different from that of clothes of another person or persons around the person to be tracked, the closes of the person to be tracked as an object of tracking. With the method, however, when the clothes of the person to be tracked are pulled in to the pull-in position at the center of the display screen, the face of the person sometimes protrudes from within the display screen as seen in FIG. 4C.

To eliminate this, in the video camera system of FIG. 1, the tracking pull-in position setting apparatus 19 can be manually operated to set the pull-in position to an arbitrary position. In particular, where the display screen is such as shown in FIG. 4C, if a user manually operates the lens block 1 to set the pull-in position ($X_{center}$, $y_{center}$), for example, to a different position (X/2, 4y/5), then the face of the person being tracked can be positioned at the center of the display screen as seen in FIG. 4D.

Subsequently, automatic tracking performed by the tracking driving amount calculation apparatus 16 in accordance with a gain set by the gain promotion apparatus 20 will be described. As described hereinabove with reference to FIG. 21, where the speeds of the panning and tilting are varied in response only to the displacement amount e while the gain is kept fixed, when an imaging object moves, in the proximity of an end of the display screen, that is, in the proximity of a screen frame, toward the outside of the display screen, the imaging object is sometimes missed. To eliminate this, the tracking driving amount calculation apparatus 16 determines the gains in speed of panning and tilting depending upon at which position an imaging object is present on the display screen.

In particular, the gain promotion apparatus 20 sets, based on the imaging object position from the imaging object position detection apparatus 15, a gain to be used to detect the speeds when panning and/or tilting are to be performed, and outputs the gain to the tracking driving amount calculation apparatus 16. Here, the gain promotion apparatus 20 sets the gain such that, when the imaging object is positioned in the proximity of the center of the display screen, for example, a gain which is set in an ordinary case such as 1 (the region in the proximity of the center of the display screen with which such a gain as just mentioned will be hereinafter referred to similarly as ordinary gain region) is set, but when the imaging object is positioned in the proximity of an end of the display screen, a higher gain such as, for example, 2 is set (the region in the proximity of an end of the display screen with which such a higher gain as just mentioned is set will be hereinafter referred to suitably as increased gain region).

The tracking driving amount calculation apparatus 16 determines speeds of panning and/tilting based on the gain from the gain promotion apparatus 20. Consequently, while the imaging object as an object of tracking is moving in the rightward direction, for example, as seen in FIGS. 5A to 5D, when the imaging object is within the ordinary gain region (blank area in FIGS. 5A to 5D) as seen in FIGS. 5A and 5B, panning and/or tilting are performed at speeds determined with the gain set to 1. Then, if the imaging object increases its speed of the rightward movement and comes to the increased gain region (shadowed portion in FIGS. 5A to 5D) as seen in FIGS. 5C and 5D, panning and/or tilting are performed at speeds determined with the gain set to 2. In the video camera system of FIG. 1, an imaging object is prevented from being missed in such a manner as described above.

Figure 7:
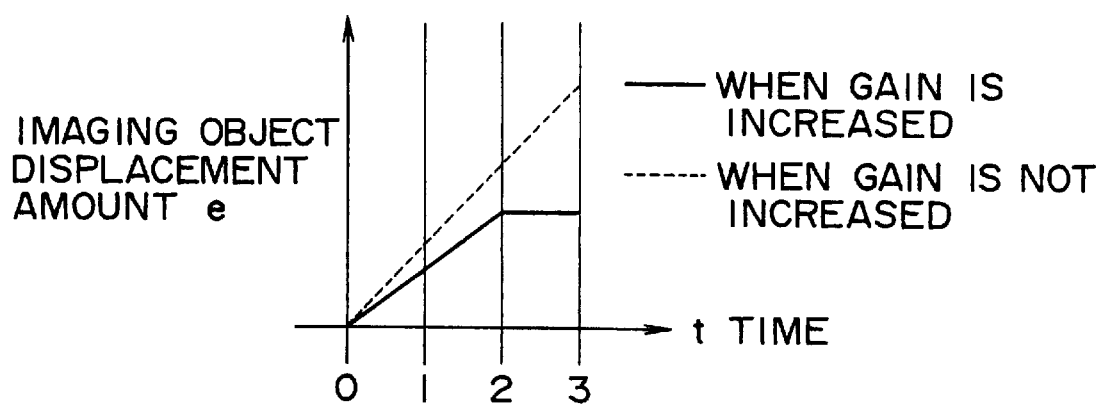
FIG. 7 is a diagram illustrating a variation of the displacement amount when the gain is varied.

A variation in speed of panning or tilting and a variation in displacement amount between the position of an imaging object and the pull-in position (it is assumed that the pull-in position is set to the center of the screen) are illustrated in FIGS. 6 and 7 wherein the states shown in FIGS. 5A to 5D are represented as states at times t=0 to 3, respectively.

In FIG. 6, the speed of the imaging object is indicated by a thick solid line, the speed of panning or tilting when the gain is fixed (in an ordinary condition) is indicated by a dotted line, and the speed of panning or tilting when the gain is varied in accordance with the position of the imaging object is indicated by a thin solid line. From FIG. 6, it can be seen that, when the gain is fixed, as the speed of the imaging object increases, the speed of panning or tilting cannot follow up the speed of the imaging object and consequently the imaging object is missed, but where the gain is varied, the speed of the panning or tilting can follow up the speed of the imaging object and consequently the state wherein the imaging object is caught can be maintained.

In FIG. 7, the displacement amount where the gain is fixed is indicated by a broken line while the displacement where the gain is varied in accordance with the position of the imaging object is indicated by a solid line. From FIG. 7, it can be seen that, where the gain is fixed, as the speed of the imaging object increases, the displacement increases and consequently the imaging object will be missed, but where the gain is varied, the displacement amount does not increase beyond a certain value and consequently the state wherein the imaging object is caught can be maintained.

Subsequently, predictive tracking control by the predictive tracking apparatus 21 will be described with reference to FIGS. 8A to 8C and 9A to 9D. As described hereinabove, predictive tracking by the predictive tracking apparatus 21 is performed when an imaging object is missed. By the way, where the location at which the imaging object is missed is in the proximity of the center of the screen, except in such a case that the imaging object disappears suddenly from within the angle of view, it is normally considered that the imaging object is hidden behind some other body such as a tree or a pole. Accordingly, since the range within which the imaging object is present is estimated to be in the proximity of the position at which it has been missed, the predictive tracking apparatus 21 predicts that a small range in the proximity of the position at which the imaging object has been missed is the range in which the imaging object is present. Consequently, the predictive tracking apparatus 21 performs tracking of the imaging object (panning and/or tilting) within the predicted range.

More particularly, for example, if the imaging object moves in the panning direction from the left to the right in FIG. 8A and becomes hidden behind some other body such as a tree in the proximity of the center of the display screen (FIG. 8B), resulting in miss of the imaging object, then a range from the position at which the imaging object has been missed to another position spaced from the position by a distance equal to, for example, ¼ the horizontal length d of the display screen in the panning and/or tilting directions (in this instance, only in the panning direction) is predicted as a range in which the imaging object may be present. In this instance, if the imaging object comes out from behind the tree, then the imaging object will be caught as seen in FIG. 8C.

On the other hand, where the location at which the imaging object has been missed is in the proximity of an end of the screen, the predictive tracking apparatus 21 predicts a range larger than that described above with reference to FIGS. 8A to 8C as a range in which the imaging object may be present, and tracking of the imaging object (panning and/or tilting) is performed within the predicted range. More particularly, for example, if the imaging object moves in the panning direction from the left to the right in FIG. 9A and becomes hidden behind some other body such as a tree in the proximity of an end of the display screen (FIG. 9B), resulting in miss of the imaging object, then a range from the position at which the imaging object has been missed to another position spaced from the position by a distance equal to, for example, ¾ the horizontal length d of the display screen in the panning and/or tilting directions (in this instance, only in the panning direction) is predicted as a range in which the imaging object may be present. Also in this instance, if the imaging object comes out from behind the tree, then the imaging object will be caught as seen in FIG. 9C.

In the case illustrated in FIGS. 9A to 9C (also in the case illustrated in FIGS. 8A to 8C), since the range from the position at which the imaging object has been missed to another position spaced from the position by a distance equal to ¾ the horizontal length d of the display screen in the panning and/or tilting directions when the imaging object is missed is predicted as a range in which the imaging object may be present, the position at which the imaging object has been missed remains included in the angle of view (image outputted from the lens block 1) even if panning and/or tilting are performed so that the predicted range may be imaged. Accordingly, for example, in such a case wherein an imaging object is hidden behind a body such as a tree in the proximity of an end of the screen and then stands there as seen in FIG. 9D, if the imaging object comes out behind the tree, then it will be caught by the lens block 1.

It is to be noted that a blank portion or a shadowed portion in each of FIGS. 8A to 8C and 9A to 9D represents a region having such a small or large region as described above predicted as a range in which an imaging object may be present, and it may be same as or different from an ordinary gain region or an increased gain region described hereinabove with reference to FIGS. 5A to 5D. The blank region and the shadowed region in each of FIGS. 8A to 8C and 9A to 9D are hereinafter referred to suitably as ordinary prediction region and enlarged prediction region, respectively.

Subsequently, operation of the video camera system of FIG. 1 will be further described with reference to the flow chart of FIG. 10. First in step S1, it is discriminated by the imaging object presence detection apparatus 14 whether or not an imaging object to be tracked is present in the display screen (angle of view). If it is discriminated in step S1 that the imaging object is present, then the control sequence advances to step S2, in which the mode of the apparatus is set to an imaging object tracking mode and then processing of the imaging object tracking mode is performed, whereafter the control sequence advances to step S4. On the other hand, if it is discriminated in step S1 that the imaging object is not present, then the control sequence advances to step S3, in which the mode of the apparatus is set to a predictive tracking mode and then processing of the predictive tracking mode is performed, whereafter the control sequence advances to step S4. In step S4, driving method selection processing is performed, and then the control sequence returns to step S1 so that the processing beginning with step S1 is repeated.

Figure 10:
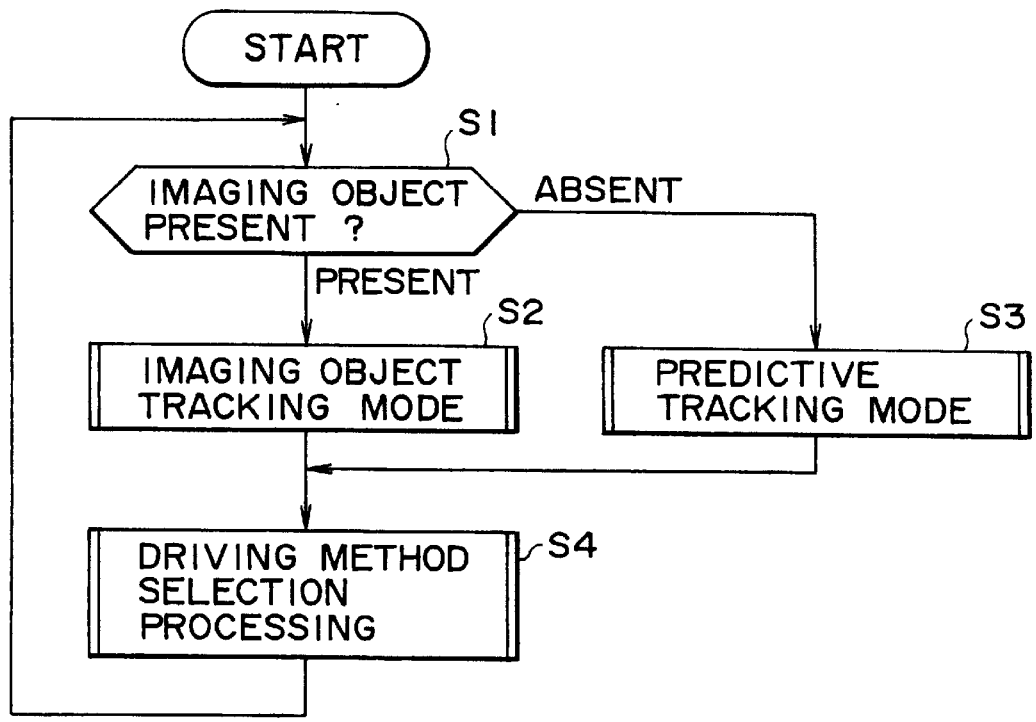
FIG. 10 is a flow chart illustrating operation of the video camera system of FIG. 1.
Figure 11:
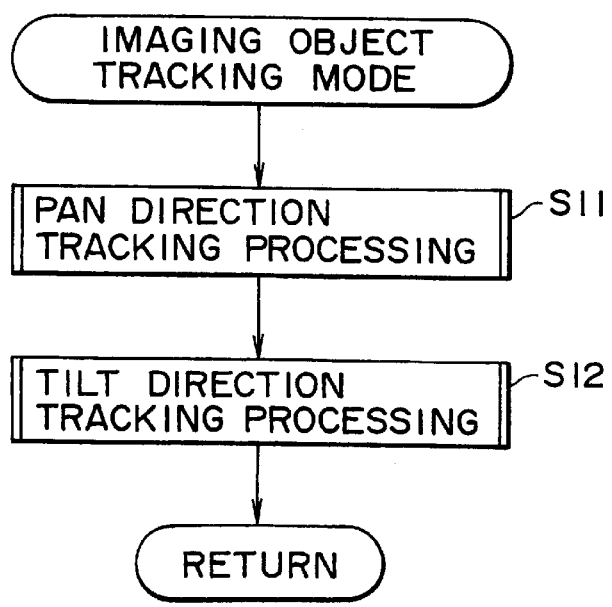
FIGS. 11 and 12 are flow charts illustrating details of operation in different steps in the flow chart of FIG. 10.

FIG. 11 illustrates details of the processing of the imaging object tracking mode in step S2 of FIG. 10. The processing of the imaging object tracking mode is performed by the tracking driving amount calculation apparatus 16. In particular, the tracking driving amount calculation apparatus 16 first performs, in step S11, panning direction (horizontal direction) tracking processing, and then the control sequence advances to step S12, in which tilting direction (vertical direction) tracking processing is performed, whereafter the processing of the tracking driving amount calculation apparatus 16 is ended. It is to be noted that, while, in the flow chart of FIG. 11, it is illustrated that the panning direction tracking processing is performed first and then the tilting direction tracking processing is performed, alternatively the panning direction tracking processing may be performed after the tilting direction tracking processing is performed or else the panning direction tracking processing and the tilting direction tracking processing may be performed in parallel to each other.

Figure 12:
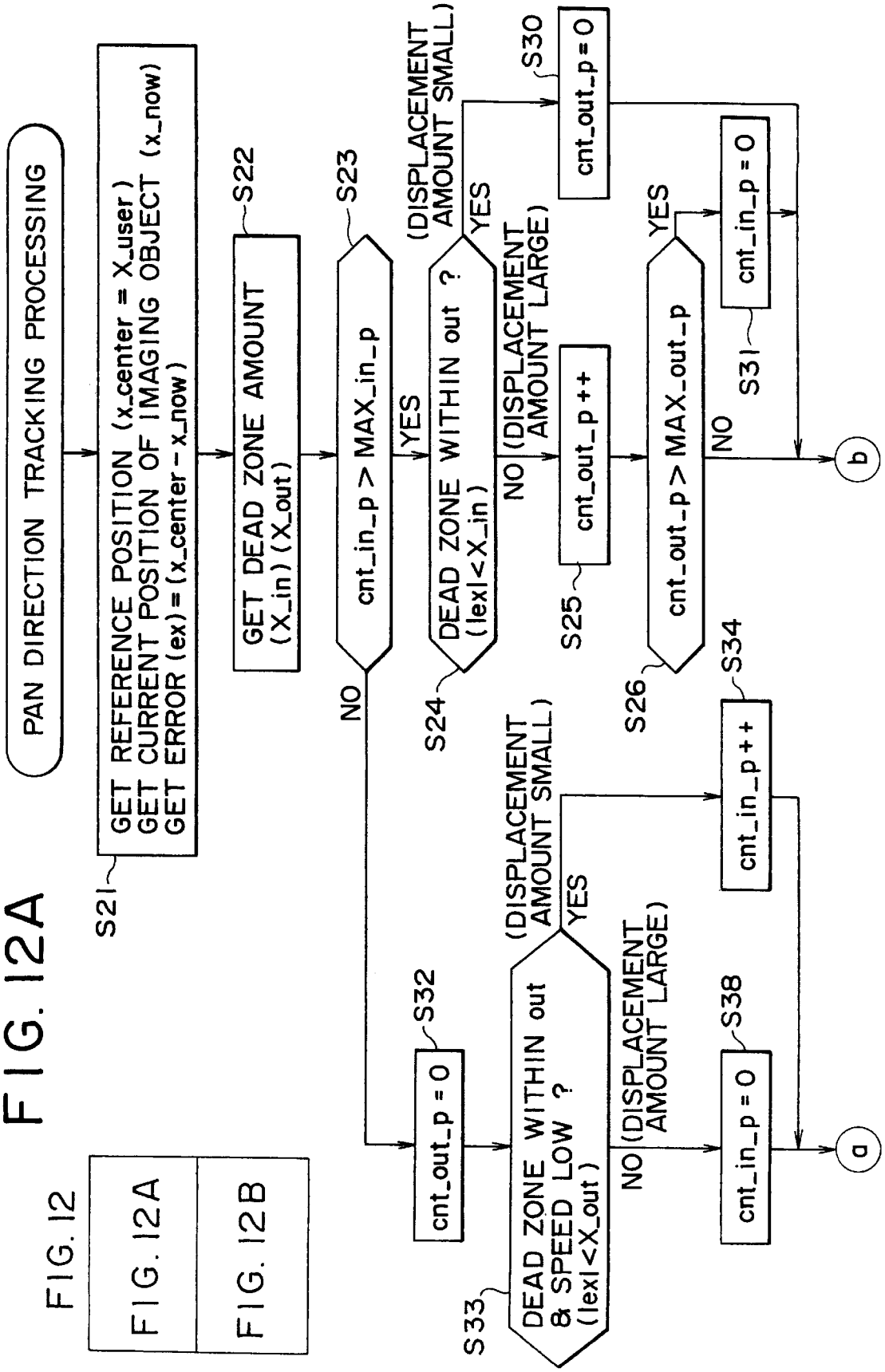

FIG. 12 illustrates details of the panning direction tracking processing in step S11 of FIG. 11. Referring to FIG. 12, in the panning direction tracking processing illustrated, the x coordinate (X_user) of a pull-in position (X_user, Y_user) set by manual operation of the tracking pull-in position setting apparatus 19, that is, a component of the pull-in position in the panning direction, is placed into a variable x_center first in step S21. Further, the x coordinate (x_now) of an imaging object position (x_now, y_now) outputted from the imaging object position detection apparatus 15, that is, a component of the imaging object position in the panning direction, is acquired, and the displacement ex (=x_center −x_now) in the panning direction is calculated.

Then, the control sequence advances to step S22, in which a panning direction component of a dead zone amount set by manual operation of the dead zone amount selection apparatus 18 is acquired. In particular, in step S22, the panning direction component (X_in) from between the panning direction component X_in and the tilting direction component Y_in of a control start displacement amount and the panning direction component X_out from between the panning direction component X_out and the tilting direction component Y_out of a control stop displacement amount are acquired.

Thereafter, the control sequence advances to step S23, in which it is discriminated whether or not a counter cnt_in_p for stopping the automatic tracking control has a higher value than a predetermined value MAX_in_p (MAX_in_p is an integer equal to or higher than 1). If it is discriminated in step S23 that the counter cnt_in_p has a value higher than the predetermined value MAX_in_p, the control sequence advances to step S24 in which it is discriminated whether or not the absolute value |ex| of the displacement amount is smaller than the control start displacement amount X_in. On the other hand, when it is discriminated in step S24 that the absolute value |ex| of the displacement amount is not smaller than the control start displacement amount X_in, that is, when the displacement amount between the imaging object position and the pull-in position is large, the control sequence advances to step S24 in which a counter cnt_out_p for starting automatic tracking control is incremented by one. The control sequence advances to step S26 in which it is discriminated whether or not the counter cnt_out_p is higher than the predetermined MAX_out_p (MAX_out_p is an integer higher than 1).

Besides, if it is discriminated in step S26 that the counter cnt_out_p is not higher than the predetermined value MAX_out_p, the control sequence advances to step S27, in which the gain a_p to be used for calculation of the speed of panning is set to 0, whereafter the control sequence advances to step S28. In step S28, the speed Vp of panning is calculated in accordance with, for example, the following expression:

$$Vp=|1/zoom\_now \times a\_p \times f(ex)| \qquad (3)$$

where Zoom now is zoom information supplied from the zoom position detection apparatus 17. The speed Vp is calculated using the zoom information Zoom_now because of the following reason. In particular, a_p×f(ex) on the right side of the expression (3) above exhibits, in the present embodiment, a value which is optimum when the zoom lens is, for example, at the widest side position. Therefore, in order to calculate the optimum speed Vp in a zooming up state, correction with the current zoom information Zoom now must be performed.

After the panning speed Vp is calculated in step S28, the control sequence advances to step S29 in which the direction of panning is determined and then the panning direction tracking processing is ended. In particular, in step S29, the panning direction is determined in accordance with the sign of the expression in the absolute value on the right side of the expression (3) (that is, 1/Zoom_now×a_p×f(ex)). More particularly, for example, where the x-y coordinate system of the display screen is used as shown in FIG. 4A and the sign of f(ex) is the same as the sign of the displacement amount ex, when the sign of the expression (1/Zoom_now× a_p×f(ex)) is positive or negative, the panning direction is determined to be rightward or leftward. When the value of the expression of (1/Zoom_now×a_p×f(ex)) is 0, since Vp=0, no panning is performed.

It is to be noted that, where the processing in step S28 is performed after the processing in step S27, since the gain a_p is set to 0 in step S27, no panning is performed.

On the other hand, if it is discriminated in step S24 that the absolute value |ex| of the displacement amount is smaller than the control start displacement amount X_in, that is, when the displacement amount between the imaging object position and the pull-in position is small, the control sequence advances to step S30, in which the counter cnt_out_p is reset to 0. Then, the control sequence advances to step S27 so that the processing described above is performed thereafter. Consequently, also in this instance, no panning is performed.

In short, when the absolute value |ex| of the displacement amount is smaller than the control start displacement amount X_in or when, even after the absolute value |ex| of the displacement amount becomes equal to or higher than the control start displacement amount X_in, this state does not continue and the absolute value |ex| becomes smaller than the control start displacement amount X_in, no panning is performed.

On the other hand, if the state wherein the displacement amount between the imaging object position and the pull-in position is large continues and consequently it is successively discriminated in step in S24 that the absolute value |ex| of the displacement amount is smaller than the control start displacement amount X_in (if the counter cnt_out_p is not reset in step S30), the counter cnt_out_p is successively incremented in step S25. As a result, the counter cnt out p may finally become larger than the predetermined value MAX_out_p.

In this instance, it is discriminated in step S26 that the counter cnt_out_p is larger than the predetermined value MAX_out_p, and the control sequence advances to step S31, in which the counter cnt_in_p is reset to 0. In particular, if the state wherein the displacement amount between the imaging object position and the pull-in position is large is successively detected by MAX_out_p times or more, then the counter cnt_in_p is reset to 0 in step S31.

The control sequence advances to step S27 so that the processing described above is performed thereafter. However, when panning direction tracking processing is performed subsequently, since the counter cnt_in_p is in a state reset to 0, it is discriminated in step S23 that the counter cnt_in_p is not larger than the predetermined value MAX_in_p. In this instance, the control sequence advances to step S32, in which the counter cnt_out_p is reset to 0, whereafter the control sequence advances to step S33.

In step S33, it is discriminated whether the absolute value |ex| of the displacement amount is smaller than the control strop displacement amount X_out and the current panning speed Vp is lower then the predetermined speed. If it is discriminated in step S33 that the absolute value |ex| of the displacement amount is smaller than the control stop displacement amount X_out and the current panning speed Vp is lower than the predetermined speed, that is, when the displacement amount between the imaging object position and the pull-in position is small and the current panning speed Vp is low (or no panning is proceeding), the control sequence advances to step S34, in which the counter cnt_in_p is incremented by 1. Thereafter, the control sequence advances, via one of steps S35, S36 and S37 which will be hereinafter described, to step S28 so that the processing described above is performed thereafter.

Besides, if it is discriminated in step S33 that the absolute value |ex| of the displacement amount is not smaller than the control stop displacement amount X_out or the current panning speed vp is not lower than the predetermined speed, that is, when the displacement amount between the imaging object position and the pull-in position is large or the current panning speed Vp is high, the control sequence advances to step S38, in which the counter cnt_in_p is reset to 0. Thereafter, the control sequence advances to step S38, in which it is discriminated based on the output of the imaging object position detection apparatus 15 by the gain promotion apparatus 20 whether or not the imaging object is present in the increased gain region (in the proximity of an end of the display screen). If it is discriminated in step S35 that the imaging object is not present in the increased gain region, that is, when the imaging object is present in the ordinary gain region, the control sequence advances to step S36, in which the gain a_p for determination of the panning speed is set to 1. On the other hand, when it is discriminated in step S36 that the imaging object is present in the increased gain region, the control sequence advances to step S37, in which the gain a_p is set to 2.

After the processing in step S36 or S37, the control sequence advances to step S28, in which the processing described above is performed. Accordingly, when it is discriminated in step S23 that the counter cnt_in_p is not larger than the predetermined value MAX_in_p, panning is performed.

It is to be noted that, if the state wherein the displacement amount between the imaging object position and the pull-in position is small and panning is proceeding at a low speed (or no panning is proceeding) continues and consequently the advancement of the control sequence from step S33 to step S34 successively occurs, then the counter cnt_in_p is successively incremented in step S34. Consequently, the counter cnt_in_p finally becomes larger than the predetermined value MAX_in_p. In this instance, if panning direction tracking processing is performed subsequently, then since the counter cnt_in_p is larger than the predetermined value MAX_in_p, it is discriminated in step S23 that the counter cnt_in_p is larger than the predetermined value MAX_in_p. Accordingly, in this instance, panning will not be performed (this is because the gain a_p is set to 0 in step S27).

On the other hand, when the displacement amount between the imaging object position and the pull-in position becomes large or when the imaging object moves at a high speed and consequently also panning is performed at a high speed, the processing advances from step S33 to step S38, and consequently, the counter cnt_in_p is reset to 0. Accordingly, in this instance, panning is continued.

Figure 13:
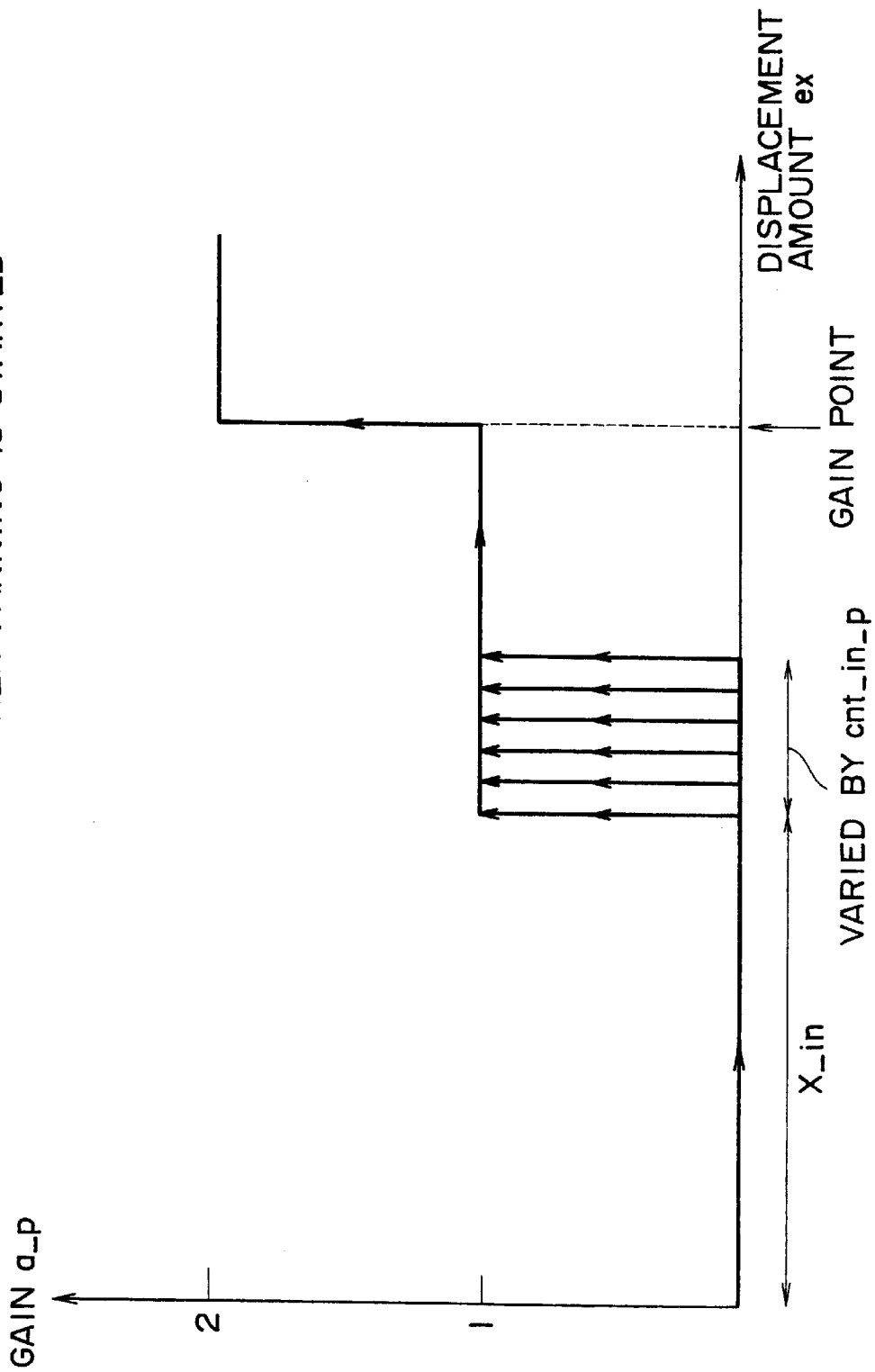
FIG. 13 is a diagram illustrating a relationship between the displacement amount and the gain when panning is started.

FIG. 13 illustrates a relationship between the displacement amount ex and the gain a_p when panning is started by the panning direction tracking processing of FIG. 12. It is to be noted that, since the difference between variations of the gain a_p when the displacement amount is positive and negative resides only in that the variations are symmetrical with each other where the pull-in position is set to the center of the display screen, the relationship mentioned above only when the displacement amount is in the positive is shown in FIG. 13.

As seen from FIG. 13, in the case where the displacement amount ex remains within the control start displacement amount X_in, the gain a_p is 0, and consequently, no panning is performed. Then, if the displacement amount ex exceeds the control start displacement amount X_in, the gain a_p is changed to 1, and panning is started. It is to be noted that a fluctuation of the displacement amount ex at which the gain a_p changes from 0 to 1 is provided by the counter cnt_in_p. Further, if the displacement amount ex increases to such a magnitude that the imaging object is missed, that is, if the imaging object comes into the increased gain region, then the gain a_p is set to 2.

Figure 14:
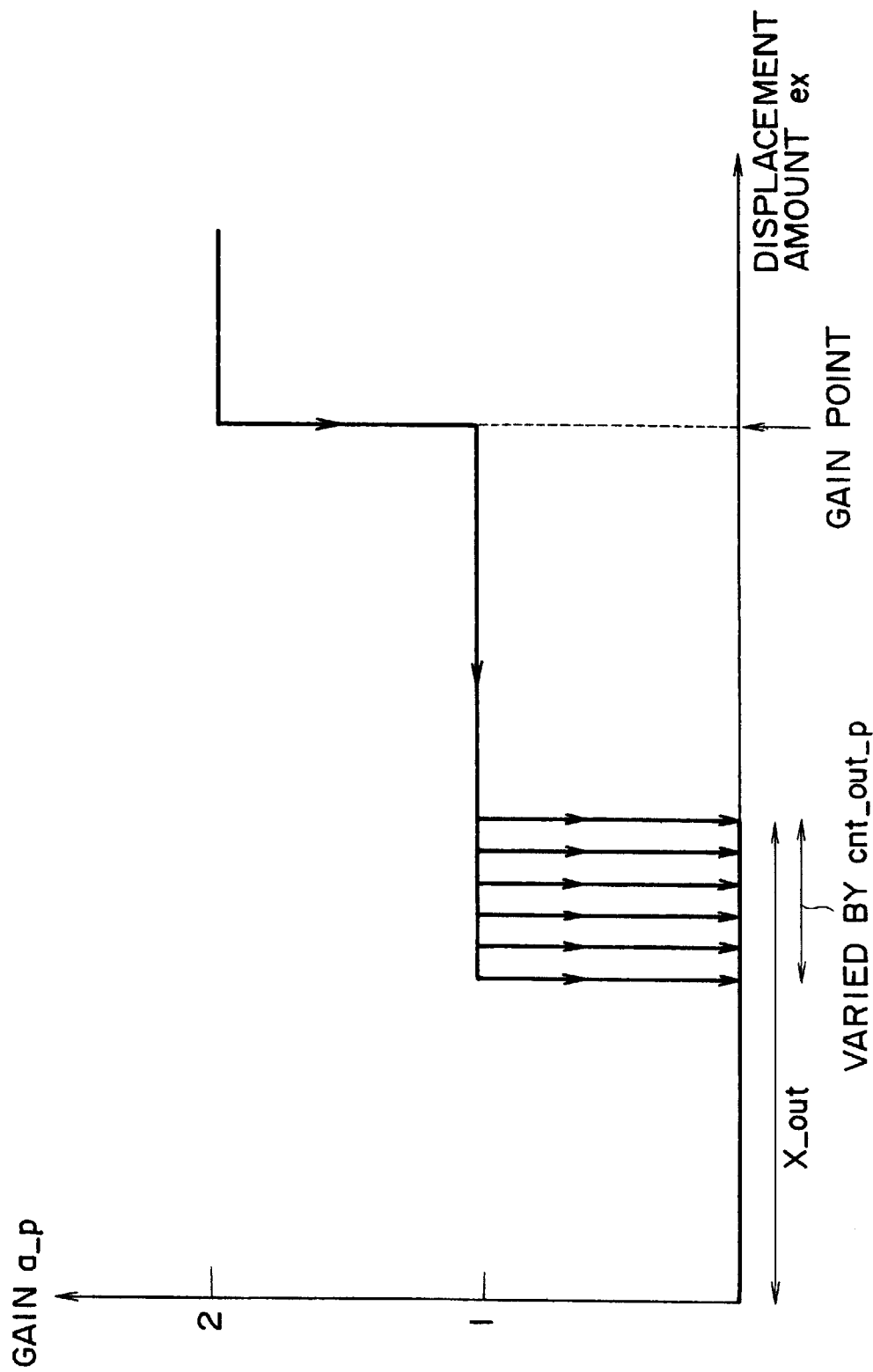
FIG. 14 is a similar view but illustrating a relationship between the displacement amount and the gain when panning is stopped.

FIG. 14 illustrates a relationship between the displacement amount ex and the gain a_p when panning is stopped by the panning direction tracking processing of FIG. 12. It is to be noted that, also in FIG. 14, the relationship only when the displacement amount is positive is shown similarly as in FIG. 13.

As seen from FIG. 14, when the displacement amount ex has such a magnitude that the imaging object is missed, that is, here, when the imaging object is present in the increased gain region, the gain a_p is set to 2. Then, if the imaging object moves out of the increased gain region into the ordinary gain region, then the gain a_p is set to 1. If the displacement amount ex thereafter becomes smaller than the control stop displacement amount, then the gain a_p is set to 0, and consequently, panning is stopped. It is to be noted that a fluctuation of the displacement amount ex at which the gain a_p changes from 1 to 0 is provided by the counter cnt_out_p.

The flow chart of FIG. 15 illustrates a flow of the tilting direction tracking processing in step S12 of FIG. 11. In this tilting direction tracking processing, merely processing in steps S41 to S58 similar to steps S21 to S38 of FIG. 12 is performed for the tilting direction, and accordingly, overlapping description of it is omitted here to avoid redundancy.

Figure 16B:
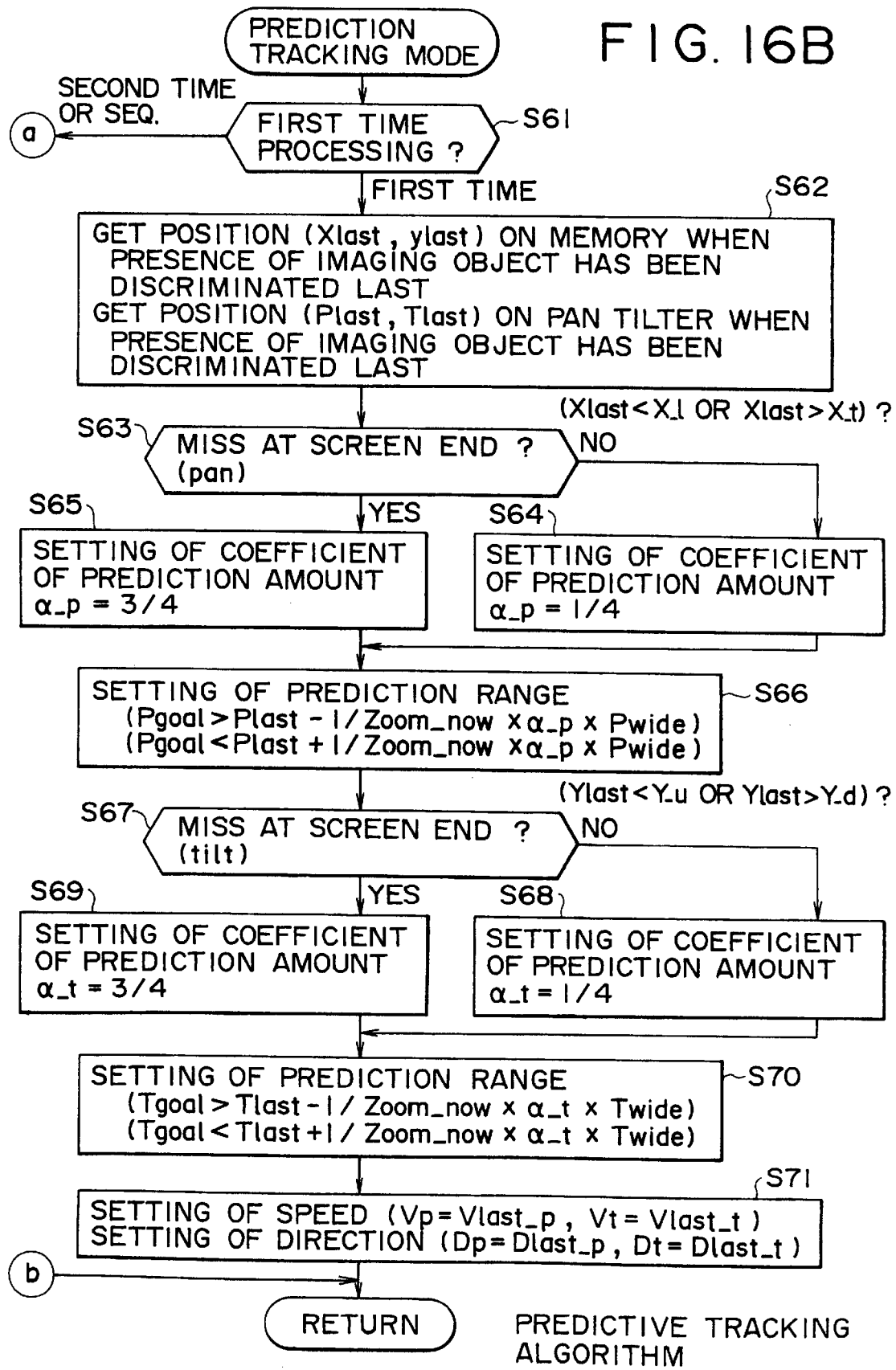
FIG. 16 is a flow chart illustrating details of operation in a further step of the flow chart of FIG. 10.

FIG. 16 illustrates details of the predictive tracking mode in step S3 of FIG. 10. The processing of the predictive tracking mode is performed by the predictive tracking apparatus 21. In particular, referring to FIG. 16, the predictive tracking apparatus 21 discriminates first in step S61 whether or not discrimination processing in this step S61 is performed for the first time after a change in mode from the imaging object tracking mode to the predictive tracking mode. If it is discriminated in step S61 that the discrimination processing in this step S61 is performed for the first time, the control sequence advances to step S62, in which the predictive tracking apparatus 21 refers to the output of the imaging object position detection apparatus 15 to recognize the imaging object position (xlast, ylast) on the frame memory 10 when imaging object presence discrimination was received last from the imaging object presence detection apparatus 14. Further, in step S62, the predictive tracking apparatus 21 refers to the output of the panning and tilting position detection apparatus 22 to recognize the positions of panning and tilting (Plast, Tlast) (Plast or Tlast represents an angle or the like of panning or tilting, for example, by the motor 26 or 27 and will be hereinafter referred to suitably as panning position or tilting position) when imaging object presence discrimination was received last from the imaging object presence detection apparatus 14.

Then, the control sequence advances to step S63, in which it is discriminated whether or not, when attention is paid only to the panning direction, the position at which the imaging object was present immediately after it was missed is within the enlarged prediction region.

Figure 17:
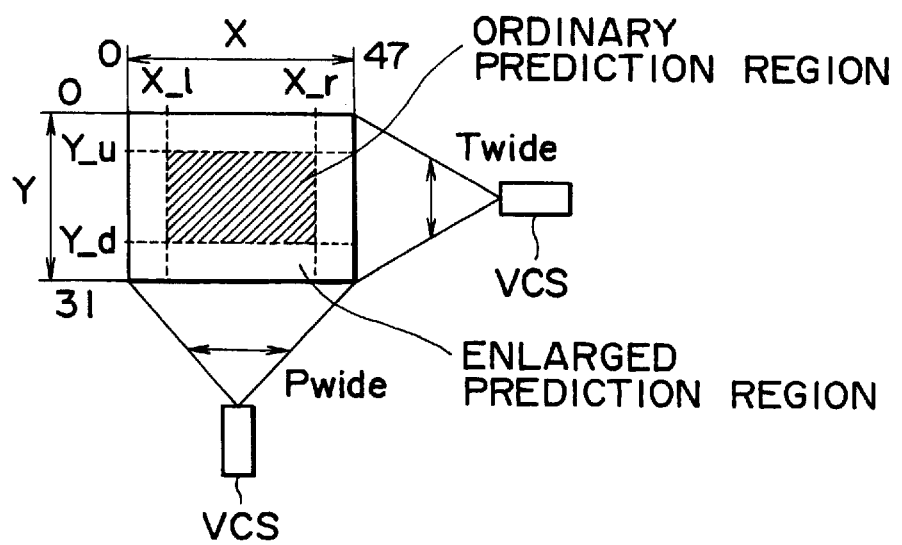
FIG. 17 is a diagrammatic view showing an ordinary prediction region and an expanded prediction region.

Here, it is assumed that the enlarged prediction region and the ordinary prediction region are set, for example, in such a manner as seen in FIG. 17. In particular, if it is assumed that an image outputted from the lens block 1 is stored in the frame memory 10 as another image of 48×32 pixels obtained by sampling out the image from the lens block 1 as described hereinabove and the x axis extends rightwardly from the left and the y axis extends downwardly from above of a display screen substantially formed on the frame memory 10, then a range defined by $X\_1 \leq x \leq X\_r$ and $Y\_u \leq y \leq Y\_d$ and indicated by a shadowed portion in FIG. 17 is set as the ordinary prediction region, and the other region defined by $x<X\_1$, $X\_r<x$, $y<Y\_u$ and $Y\_d<y$ is set as the enlarged prediction region.

It is to be noted that, in FIG. 17, Pwide represents a difference in panning position when panning is performed from the right end to the left end (or from the left end to the right end) of the display screen while the zoom lens is positioned at the widest side position. Meanwhile, Twide represents a difference in tilting position when tilting is performed from the upper end to the lower end (or from the lower end to the upper end) of the display screen while the zoom lens is positioned at the widest side position.

Based on the enlarged prediction region and the ordinary prediction region set as described above, it is discriminated in step S63 whether Xlast is smaller than X_1 or larger than X_r. If it is discriminated in step S63 that Xlast is not smaller than X_1 nor larger than X_r, that is, when the position at which the imaging object was present before it was missed is not within the enlarged prediction region but within the ordinary prediction region, the control sequence advances to step S64, in which a coefficient α_p for prediction of a range in the panning direction in which the imaging object may be present (the coefficient will be hereinafter referred to suitably as prediction coefficient) is set, for example, to ¼, whereafter the control sequence advances to step S66.

On the other hand, when it is discriminated in step S63 that Xlast is smaller than X_1 or larger than X_r, that is, when the position at which the imaging object was present immediately before it was missed is within the enlarged prediction region, the control sequence advances to step S65, in which the coefficient α_p for prediction of a range in which the imaging object may be present is set, for example, to ¾, whereafter the control sequence advances to step S66.

In step S66, a predicted range Pgoal in the panning direction in which the imaging object may be present is set in accordance with, for example, the following expression:

Plast−1/Zoom_now×α_p×Pwide

<Pgoal<

Plast+1/Zoom_now×α_p×Pwide (4)

It is to be noted that, also in this instance, correction is performed with the zoom information Zoom_now is performed from a similar reason to that of the case of step S28 of FIG. 12.

After the processing in step S66, the control sequence advances to step 67, in which it is discriminated whether or not, when attention is paid only to the tilting direction, the position at which the imaging object was present immediately before it was missed is within the expanded prediction region. In particular, it is discriminated in step S67 whether Ylast is smaller than Y_u or larger than Y_d. If it is discriminated in step S67 that Ylast is not smaller than Y_u nor larger than Y_d, that is, when the position at which the imaging object was present immediately before it was missed is not within the expanded prediction region but within the ordinary prediction region, the control sequence advances to step S68, in which a coefficient $\alpha\_t$ for prediction of a range in the tilting direction wherein the imaging object may be present is set, for example, to ¼, whereafter the control sequence advances to step S70.

On the other hand, when it is discriminated in step S67 that Ylast is smaller than Y_u or larger than Y_d, that is, when the position at which the imaging object was present immediately before it was missed is within the expanded prediction region, the control sequence advances to step S69, in which the coefficient $\alpha\_t$ for prediction of a range in which the imaging object may be present is set, for example, to ¾, whereafter the control sequence advances to step S70.

In step S70, a predicted range Tgoal in the tilting direction in which the imaging object may be present is set in accordance with, for example, the following expression:

$$\text{Tlast}-1/\text{Zoom\_now} \times \alpha\_t \times \text{Twide}$$
$$<\text{Tgoal}<$$
$$\text{Tlast}+1/\text{Zoom\_now} \times \alpha\_t \times \text{Twide} \quad (5)$$

It is to be noted that, also in this instance, correction is performed with the zoom information Zoom_now from a similar reason to that of the case of step S28 of FIG. 12.

When the imaging object is missed in the ordinary prediction region or the expanded prediction region as described hereinabove with reference to FIGS. 8A to 8C and 9A to 9D, a region of a small range or a large range in which the imaging object may be present is predicted in such a manner as described above.

Thereafter, the control sequence advances to step S71, in which a speed and a direction for panning and/or tilting within the predicted ranges indicated by the expressions (4) and (5) above are set, and the processing is completed. In particular, in step S71, the speed Vp or Vt at which panning or tilting is performed is set in accordance with, for example, the following expression:

$$Vp=\text{Vlast\_p}, Vt=\text{Vlast\_t}$$

and the direction Dp or Dt in which panning or tilting is performed is set in accordance with, for example, the following expression:
ti Dp=Dlast_p, Dt=Dlast_t It is to be noted that Vlast_p and Vlast_t represent the panning and tilting speeds immediately before the imaging object is missed, and Dlast_p and Dlast_t represent the panning and tilting speeds immediately before the imaging object is missed.

On the other hand, if it is discriminated in step S61 that the discrimination processing in this step S61 is performed not for the first time, the control sequence advances to step S72, in which it is discriminated whether panning has been performed so that the range in which the imaging object is present with regard to the panning direction may be imaged. If it is discriminated in step S72 that panning has not been performed so that the range in which the imaging object is present with regard to the panning direction may be imaged, then the control sequence advances to step S73, in which the speed Vp or the direction Dp of panning is set in a similar manner as in step S71, whereafter the control sequence advances to step S75.

On the other hand, if it is discriminated in step S72 that panning has been performed so that the range in which the imaging object is present with regard to the panning direction may be imaged, then the control sequence advances to step S74, in which the speed Vp and the direction Dp of panning are both set to 0, whereafter the control sequence advances to step S75.

In step S75, it is discriminated whether tilting has been performed so that the range in which the imaging object is present with regard to the tilting direction may be imaged. If it is discriminated in step S75 that tilting has not been performed so that the range in which the imaging object is present with regard to the tilting direction may be imaged, the control sequence advances to step S77, in which the speed Vt or the direction Dt of tilting is set in a similar manner as in the case of step S71, and the processing is ended.

On the other hand, if it is discriminated in step S75 that tilting has been performed so that the range in which the imaging object is present with regard to the tilting direction may be imaged, the control sequence advances to step S77, in which the speed Vt and the direction Dt of tilting are both set to 0, and the processing is ended.

Figure 18:
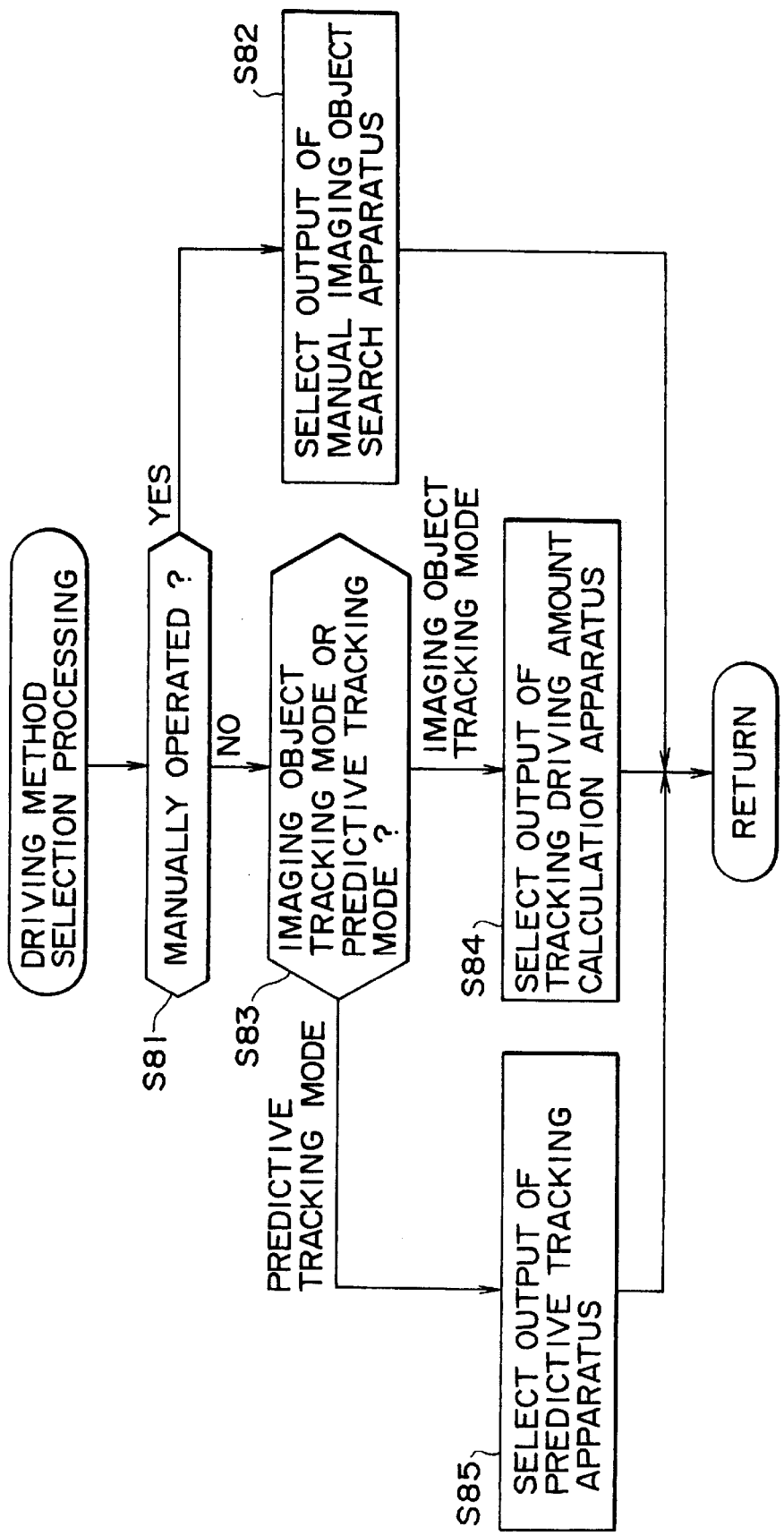
FIG. 18 is a flow chart illustrating details of operation in a still further step of the flow chart of FIG. 10.
Figure 19:
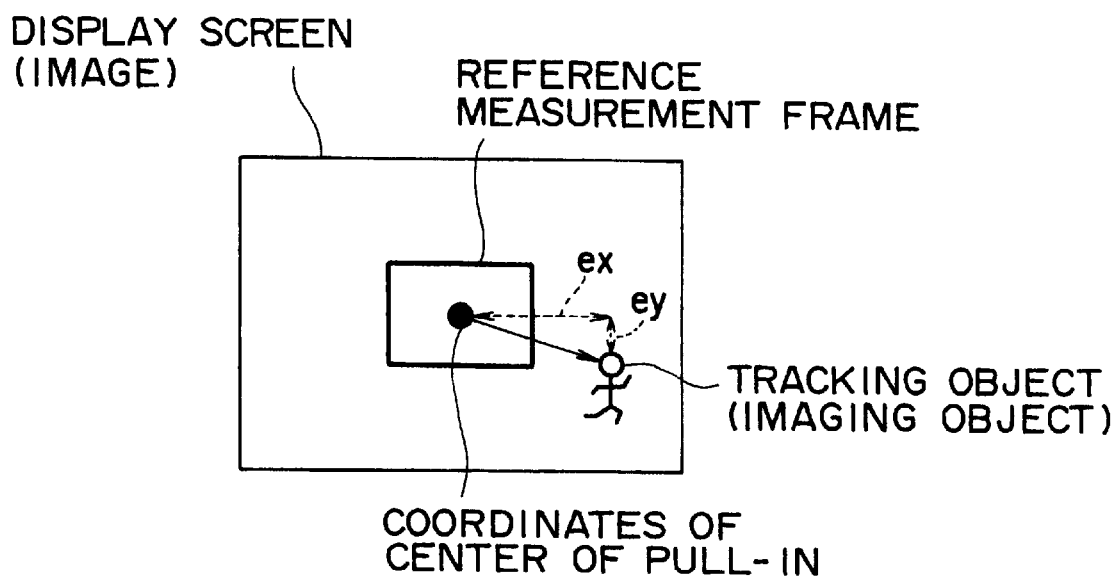
FIG. 19 is a diagrammatic view illustrating a method of tracking an imaging object.

FIG. 18 illustrates details of the driving method selection processing in step S4 of FIG. 10. The driving method selection processing is performed by the driving method selection apparatus 24. In particular, referring to FIG. 18, the driving method selection apparatus 24 first discriminates in step S81 whether or not an operation signal originating from manual operation of the manual imaging object search apparatus 23 is received. If it is discriminated in step S81 that an operation signal from the manual imaging object search apparatus 23 is received, then the control sequence advances to step S82, in which the operation signal is selected and supplied to the panning and tilting driving apparatus 25, and then the processing is ended.

Accordingly, when the manual imaging object search apparatus 23 is manually operated, since panning and/or tilting corresponding to the operation are performed preferentially, when the imaging object is recognized in error and a wrong imaging object is being tracked, panning and/or tilting operations can be performed manually so that the imaging object to be tracked originally may be pulled in without performing such an operation which may interrupt control by the tracking driving amount calculation apparatus 16 or the predictive tracking apparatus 21.

On the other hand, when it is discriminated in step S81 that an operation signal from the manual imaging object search apparatus 23 is not received, the control sequence advances to step S83, in which it is discriminated whether the mode of the apparatus is the imaging object tracking mode or the predictive tracking mode. If it is discriminated in step S83 that the mode of the apparatus is the imaging object tracking mode, then the control sequence advances to step S84, in which the output of the tracking driving amount calculation apparatus 16 is selected and supplied to the panning and tilting driving apparatus 25, and then the processing is ended. Accordingly, in this instance, panning and/or tilting are performed based on a control signal outputted from the tracking driving amount calculation apparatus 16 and representing the speeds and the directions of panning and/or tilting and so forth.

On the other hand, when it is discriminated in step S83 that the mode of the apparatus is the predictive tracking mode, the control sequence advances to step S85, in which the output of the predictive tracking apparatus 21 is selected and supplied to the panning and tilting driving apparatus 25, and then the processing is ended. Accordingly, in this instance, panning and/or tilting are performed based on a control signal outputted from the predictive tracking apparatus 21 and representing the speeds and the directions of panning and/or tilting and so forth.

What is claimed is:

1. A tracking apparatus for tracking an imaging object, comprising:

imaging means for imaging the imaging object;

driving means for driving said imaging means to perform panning and tilting;

position detection means for detecting a position of the imaging object within an image imaged by said imaging means;

reference area setting means for setting a reference area so that at least a tracking portion of said imaging object is located at a tracking position therefor within said reference area;

means for predicting a range of positions of said imaging object, said predicting means increasing the predicted range of positions if the detected position of the imaging object is in a peripheral region of the image; and automatic tracking means for calculating a displacement amount between the detected position of the imaging object and said reference area in the image and controlling said driving means based on the displacement amount so that the tracking portion of the imaging object is automatically tracked to the tracking position, said automatic tracking means controlling said driving means based on the predicted range of positions when the position detection means does not detect the imaging object.

2. The apparatus according to claim 1, wherein, when said imaging object is in the proximity of an edge of the image, said automatic tracking means controls said driving means to drive said imaging means at a higher rate than where said imaging object is located otherwise such that losing the imaging object to an area outside the image is prevented.

3. The apparatus according to claim 1, wherein, said automatic tracking means controls said driving means to drive said imaging means to center said image on a pull-in area of said imaging object; wherein, when said automatic tracking means cannot distinguish said pull-in area from other areas in the image, said automatic tracking means designates a different pull-in area based on a unique color of said imaging object not substantially found in other areas of the image.

4. A tracking method for tracking an imaging object within an image, said method comprising the steps of:

driving an imager to perform panning and tilting;

detecting a position of the imaging object in said image;

setting a reference area so that at least a tracking portion of said imaging object is located at a tracking position therefor within said reference area;

predicting a range of positions of said imaging object, increasing the predicted range of positions if the detected position of the imaging object is in a peripheral region of the image;

calculating a displacement amount between the detected position of the imaging object; and controlling said driving based on the displacement amount so that the tracking portion of the imaging object is automatically tracked to the tracking position, said controlling of said driving being based on the predicted range of positions when the imaging object is not detected at said detecting step, wherein the reference area is set to an arbitrary area in the image.

5. A tracking apparatus for tracking an imaging object, comprising:

imaging means for imaging the imaging object;

driving means for driving said imaging means to perform panning and tilting;

reference area setting means for predicting a range of positions and setting a reference area representing said predicted range of positions so that at least a tracking portion of said imaging object is located at one of said positions within said reference area, said reference area setting means increasing the predicted range of positions if the detected position of the imaging object is in a peripheral region of the image;

position detection means for detecting a position of the imaging object in an image imaged by said imaging means;

automatic tracking means for controlling said driving means based on the position of the imaging object detected by said position detection means to automatically track the imaging object;

discrimination means for discriminating whether the imaging object is present after a period of time in the reference area of the image imaged by said imaging means and generating a result of the discrimination; and predictive tracking means for predicting, when said discrimination means indicates that the imaging object is not present, a range of said reference area in said image in which the imaging object may be present and controlling said driving means within the predicted range to predictively track the imaging object, wherein said predictive tracking means predicts the range so that the position of the imaging object when said discrimination means indicates that the imaging object is not present is included in the reference area.

6. A tracking apparatus according to claim 5, wherein said predictive tracking means re-sets a size for the predicted range based on the position of the imaging object when the discrimination means indicates that the imaging object is not present in the reference area.

7. The apparatus according to claim 5, wherein, when said imaging object disappears behind an object, said predictive tracking means decreases a size of said reference area in order to prevent unstability of tracking said imaging means to said imaging object.

8. The apparatus according to claim 5, wherein when said imaging object is in the proximity of an edge of the image, said predictive tracking means increases a size of said reference area such that said imaging object is not lost to an area outside the image.

9. A tracking method for tracking an imaging object within an image, said method comprising the steps of:

driving an imager to perform panning and tilting;

detecting a position of the imaging object in said image;

predicting a range of positions and setting a reference area representing said predicted range of positions so that at least a tracking portion of said imaging object is located at one of said positions within said reference area, increasing the predicted range of positions if the detected position of the imaging object is in a peripheral region of the image;

controlling said driving based on the detected position of the imaging object to automatically track the imaging object;

discriminating whether the imaging object is present after a period of time in the reference area and generating a result of the discrimination;

predicting, when a result of discrimination indicates that the imaging object is not present in the reference area, a range in which the imaging object may be present; and controlling said driving within the predicted range to predictively track the imaging object, wherein the range is predicted so that the position of the imaging object when the result of discrimination indicates that the imaging object is not present is in the reference area.

10. A tracking apparatus for tracking an imaging object, comprising:

imaging means for imaging the imaging object;

driving means for driving said imaging means to perform panning and tilting;

position detection means for detecting a position of the imaging object within an image imaged by said imaging means;

reference area setting means for setting a reference area so that at least a portion of said imaging object is located at a tracking position therefor within said reference area;

automatic tracking means for controlling said driving means based on the detected position of the imaging object to automatically track the imaging object; and gain setting means for setting, based on the detected position of the imaging object, a gain for driving said imaging means to perform panning and tilting, wherein said gain setting means increases the gain if the detected position of the imaging object is in a peripheral region of the image, and wherein said automatic tracking means controls said driving means based on the gain.

11. A tracking method for tracking an imaging object within an image imaged by an imager, said method comprising the steps of:

driving said imager to perform panning and tilting;

detecting a position of the imaging object;

setting a reference area so that at least a portion of said imaging object is located at a tracking position therefor within said reference area; and controlling said driving based on the detected position of the imaging object to automatically track the imaging object, wherein the imager is driven with a gain that is set based on the detected position of the imaging object, wherein the gain is increased if the detected position of the imaging object is in a peripheral region of the image, and wherein said step of controlling controls said driving based on the gain.

12. A tracking apparatus for tracking an imaging object, comprising:

imaging means for imaging the imaging object;

driving means for driving said imaging means to perform panning and tilting;

position detection means for detecting a position of the imaging object within an image imaged by said imaging means;

reference area setting means for predicting a range of positions and setting a reference area representing said predicted range of positions wherein said imaging object is located at one of said positions within said reference area;

automatic tracking means for calculating a displacement amount between the position of the imaging object detected by said position detection means and said reference area in the image imaged by said imaging means and controlling said driving means based on the displacement amount so that the position of the imaging object coincides with the reference area to automatically track the imaging object;

displacement amount setting means for setting a control start displacement amount and a control stop displacement amount corresponding respectively to a minimum displacement amount and a maximum displacement amount to be used as the displacement amount when said automatic tracking means controls said driving means; and wherein said automatic tracking means controls said driving means based on the displacement amount set by said displacement amount setting means.

13. The apparatus according to claim 12, wherein said control start displacement and control stop displacement are selected to form a dead zone outside of which is a background area whereat unsubstantial motion in said image occurs such that it is assured that said imaging object is within said dead zone.

14. A tracking method for tracking an imaging object within an image, said method comprising the steps of:

driving an imager to perform panning and tilting;

detecting a position of the imaging object in an image imaged by said imager;

predicting a range of positions and setting a reference area representing said predicted range of positions wherein said imaging object is located at one of said positions within said reference area;

calculating a displacement amount between the detected position of the imaging object and said reference area in the image;

controlling said driving based on the displacement amount so that the position of the imaging object coincides with the reference area to automatically track the imaging object; and controlling said driving based on a control displacement amount and a control stop displacement amount corresponding respectively to a minimum displacement amount and a maximum displacement amount.

15. A tracking apparatus for tracking an imaging object, comprising:

imaging means for imaging the imaging object;

driving means for driving said imaging means to perform panning and tilting;

position detection means for detecting a position of the imaging object within an image imaged by said imaging means;

reference area setting means for setting a reference area so that at least a portion of said imaging object is located at a tracking position therefor within said reference area;

means for predicting a range of positions of said imaging object, said predicting means increasing the predicted range of positions if the detected position of the imaging object is in a peripheral region of the image;

automatic tracking means for controlling said driving means based on the detected position of the imaging object to automatically track the imaging object, said automatic tracking means controlling said driving means based on the predicted range of positions when the position detection means does not detect the imaging object; and manual operation means for manually operating said driving means to control said reference area setting means to set said reference area, wherein said automatic tracking means interrupts a current tracking operation to respond, when said manual operation means is manually operated, to a signal corresponding to the manual operation of said driving means.

16. A tracking method for tracking an imaging object within an image, comprising the steps of:

driving to perform panning and tilting;

detecting a position of the imaging object in an image imaged by an imaging means;

setting a reference area so that at least a portion of said imaging object is located at a tracking position therefor within said reference area;

predicting a range of positions of said imaging object, increasing the predicted range of positions if the detected position of the imaging object is in a peripheral region of the image;

controlling said driving based on the detected position of the imaging object to automatically track the imaging object, said controlling of said driving being based on the predicted range of positions when the imaging object is not detected at said detecting step; and manually operating said driving, wherein, when said driving is manually operated, a current tracking operation is interrupted to respond to a signal corresponding to the manual operation.

17. In a television telephone system, a tracking apparatus for tracking an imaging object within an image imaged by an imager, said apparatus comprising:

compression coding means for compressing and coding an image signal imaged by said imager;

transmission means for transmitting the compressed image signal;

driving means for driving said imager to perform panning and tilting;

position detection means for detecting a position of the imaging object in an image imaged by said imager;

reference area setting means for setting a reference area so that at least a tracking portion of said imaging object is located at a tracking position therefor within said reference area;

means for predicting a range of positions of said imaging object, said predicting means increasing the predicted range of positions if the detected position of the imaging object is in a peripheral region of the image imaged by said imager; and automatic tracking means for calculating a displacement amount between the detected position of the imaging object and said reference area in the image imaged by said imager and controlling said driving means based on the displacement amount so that the tracking portion of the imaging object is automatically tracked to the tracking position, said automatic tracking means controlling said driving means based on the predicted range of positions when the position detection means does not detect the imaging object.

18. In a television conference system, a tracking apparatus for tracking an imaging object within an image imaged by an imager, said apparatus comprising:

compression coding means for compressing and coding an image signal imaged by;

transmission means for transmitting the compressed image signal;

driving means for driving said imager to perform panning and tilting;

position detection means for detecting a position of the imaging object in an image imaged by said imager;

reference area setting means for setting a reference area so that at least a tracking portion of said imaging object is located at a tracking position therefor within said reference area;

means for predicting a range of positions of said imaging object, said predicting means increasing the predicted range of positions if the detected position of the imaging object is in a peripheral region of the image imaged by said imager; and automatic tracking means for calculating a displacement amount between the detected position of the imaging object and said reference area in the image imaged by said imager and controlling said driving means based on the displacement amount so that the tracking portion of the imaging object is automatically tracked to the tracking position, said automatic tracking means controlling said driving means based on the predicted range of positions when the position detection means does not detect the imaging object.

19. In a television telephone system, a tracking apparatus for tracking an imaging object within an image imaged by an imager, said apparatus comprising:

compression coding means for compressing and coding an image signal imaged by said imager;

transmission means for transmitting the compressed image signal;

driving means for driving said imager to perform panning and tilting;

position detection means for detecting a position of the imaging object in an image imaged by said imager;

reference area setting means for predicting a range of positions and setting a reference area representing said predicted range of positions wherein said imaging object is located at one of said positions within said reference area;

automatic tracking means for calculating a displacement amount between the position of the imaging object detected by said position detection means and said reference area in the image imaged by said imager and controlling said driving means based on the displacement amount so that the position of the imaging object which coincides with the reference area is automatically tracked;

displacement amount setting means for setting a control start displacement amount and a control stop displacement amount to be used as the displacement amount corresponding respectively to a minimum displacement amount and a maximum displacement amount when said automatic tracking means controls said driving means; and wherein said automatic tracking means controls said driving means based on the displacement amount set by said displacement amount setting means.

20. In a television conference system, a tracking apparatus for tracking an imaging object within an image imaged by an imager, said apparatus comprising:

compression coding means for compressing and coding an image signal imaged by said imager;

transmission means for transmitting the compressed image signal;

driving means for driving said imager to perform palming and tilting;

position detection means for detecting a position of the imaging object in an image imaged by said imager;

reference area setting means for predicting a range of positions and setting a reference area representing said predicted range of positions wherein said imaging object is located at one of said positions within said reference area;

automatic tracking means for calculating a displacement amount between the position of the imaging object detected by said position detection means and said reference in the image imaged by said imager and controlling said driving means based on the displacement amount so that the position of the imaging object which coincides with the reference area is automatically tracked;

displacement amount setting means for setting a control start displacement amount and a control stop displacement amount to be used as the displacement amount corresponding respectively to a minimum displacement amount and a maximum displacement amount when said automatic tracking means controls said driving means; and wherein said automatic tracking means controls said driving means based on the displacement amount set by said displacement amount setting means.

* * * * *